United States Patent
Hayashi et al.

(10) Patent No.: US 10,131,806 B2
(45) Date of Patent: Nov. 20, 2018

(54) AQUEOUS INK, INK CARTRIDGE, AND INK JET RECORDING METHOD

(71) Applicant: CANON KABUSHIKI KAISHA, Tokyo (JP)

(72) Inventors: Katsuhiro Hayashi, Yokohama (JP); Kousuke Yamasaki, Kawasaki (JP); Masaru Ebine, Yokohama (JP); Tsuyoshi Kasai, Tokyo (JP); Naotoshi Miyamachi, Tokyo (JP); Otome Yamashita, Yokohama (JP); Toshihiro Omagari, Kawasaki (JP); Hiromitsu Kishi, Kawasaki (JP); Naofumi Shimomura, Kawasaki (JP); Satoru Kobayashi, Fukushima (JP); Takayuki Horiuchi, Kawasaki (JP); Tsuyoshi Furuse, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/584,438

(22) Filed: May 2, 2017

(65) Prior Publication Data

US 2017/0335124 A1 Nov. 23, 2017

(30) Foreign Application Priority Data

May 20, 2016 (JP) .................. 2016-101646
Apr. 24, 2017 (JP) .................. 2017-085085

(51) Int. Cl.
*C09D 11/322* (2014.01)
*C09D 11/10* (2014.01)
(Continued)

(52) U.S. Cl.
CPC ......... *C09D 11/322* (2013.01); *B41J 2/17503* (2013.01); *C09D 11/10* (2013.01);
(Continued)

(58) Field of Classification Search
CPC ....... C09D 11/322; C09D 11/38; C09D 11/14; C09D 11/10
See application file for complete search history.

(56) References Cited

U.S. PATENT DOCUMENTS 4,838,940 A * 6/1989 Kan .................. B41C 1/105
106/31.13
5,554,213 A * 9/1996 Radigan, Jr. ........... C09D 11/38
106/31.43
(Continued)

FOREIGN PATENT DOCUMENTS

EP 0 571 190 A2 11/1993
JP H08-151544 A 6/1996
(Continued)

OTHER PUBLICATIONS

Bohlin, "Surface and porous structure of pigment coatings Interactions with flexographic ink and effects on print quality," Karlstad University Studies (2013).*
(Continued)

*Primary Examiner* — Julian D Huffman
(74) *Attorney, Agent, or Firm* — Fitzpatrick, Cella, Harper & Scinto

(57) ABSTRACT

An aqueous ink for ink jet, the aqueous ink containing a pigment and a resin. The pigment is impregnated with a compound having a structure in which at least two structures (Continued)

each represented by General Formula (1) are bonded by a glycoside bond.

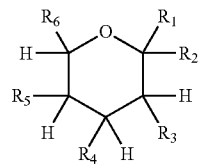

(1)

21 Claims, 2 Drawing Sheets

(51) Int. Cl.
  *C09D 11/14* (2006.01)
  *C09D 11/38* (2014.01)
  *B41J 2/175* (2006.01)
  *C09D 11/102* (2014.01)
  *C09D 11/107* (2014.01)
(52) U.S. Cl.
  CPC .......... *C09D 11/102* (2013.01); *C09D 11/107* (2013.01); *C09D 11/14* (2013.01); *C09D 11/38* (2013.01)

(56) References Cited

U.S. PATENT DOCUMENTS

| | | | |
|---|---|---|---|
| 6,171,381 B1* | 1/2001 | Yoshimura | C09D 11/14 106/31.6 |
| 7,285,310 B2 | 10/2007 | Kanke et al. | |
| 7,503,649 B2 | 3/2009 | Kishi et al. | |
| 7,868,060 B2 | 1/2011 | Sakai et al. | |
| 7,976,148 B2 | 7/2011 | Kishi et al. | |
| 7,977,409 B2 | 7/2011 | Nishiguchi et al. | |
| 8,282,725 B2 | 10/2012 | Shimomura et al. | |
| 8,389,600 B2 | 3/2013 | Suzuki et al. | |
| 8,425,027 B2 | 4/2013 | Nishiwaki et al. | |
| 8,469,504 B2 | 6/2013 | Saito et al. | |
| 8,814,341 B2 | 8/2014 | Nagao et al. | |
| 8,845,085 B2 | 9/2014 | Kobayashi et al. | |
| 8,871,013 B2 | 10/2014 | Sakai et al. | |
| 8,876,962 B2 | 11/2014 | Yamamoto et al. | |
| 8,889,763 B2 | 11/2014 | Hayashi et al. | |
| 8,926,078 B2 | 1/2015 | Kishi et al. | |
| 8,939,570 B2 | 1/2015 | Mori et al. | |
| 9,169,413 B2 | 10/2015 | Shiiba et al. | |
| 9,260,611 B2 | 2/2016 | Hayashi et al. | |
| 9,365,733 B2 | 6/2016 | Hayashi et al. | |
| 9,452,608 B2 | 9/2016 | Okamura et al. | |
| 9,662,921 B2 | 5/2017 | Sugiura et al. | |
| 2006/0147717 A1 | 7/2006 | Hasegawa et al. | |
| 2007/0228005 A1 | 10/2007 | Hasegawa et al. | |
| 2009/0136669 A1* | 5/2009 | Watarai | C09D 11/30 427/256 |
| 2010/0034972 A1 | 2/2010 | Mukae et al. | |
| 2010/0086686 A1 | 4/2010 | Nishiguchi et al. | |
| 2014/0024763 A1 | 1/2014 | Jinnou et al. | |
| 2014/0292903 A1* | 10/2014 | Maeda | C09D 11/38 347/20 |
| 2014/0296393 A1 | 10/2014 | Valentini et al. | |
| 2015/0024134 A1 | 1/2015 | Hayashi et al. | |
| 2016/0264800 A1* | 9/2016 | Nishijima | B43K 8/02 |
| 2016/0280945 A1 | 9/2016 | Mukae et al. | |
| 2016/0340530 A1 | 11/2016 | Horiuchi et al. | |

FOREIGN PATENT DOCUMENTS

| | | |
|---|---|---|
| JP | 2005-179482 A | 7/2005 |
| JP | 2011-074321 A | 4/2011 |
| JP | 2011-174046 A | 9/2011 |
| JP | 2011-213792 A | 10/2011 |
| WO | 01/42369 A2 | 6/2001 |

OTHER PUBLICATIONS

Sep. 6, 2017 European Search Report in European Patent Appln. No. 17000844.5.

* cited by examiner

AQUEOUS INK, INK CARTRIDGE, AND INK JET RECORDING METHOD

BACKGROUND OF THE INVENTION

Field of the Invention

The present invention relates to an aqueous ink, an ink cartridge, and an ink jet recording method.

Description of the Related Art

In recent years, an ink jet recording method has been used for recording of business documents using plain papers or the like as recording media, and has been used for such purposes with higher frequency. To record business documents and the like, it is important to record sharp images at high speed. In addition, business documents are likely to come into contact with other business documents, books, and stationery more frequently. On this account, the ink used for such a purpose is required to enable recording of images having excellent abrasion resistance.

To record images having photographic quality by the ink jet recording method, pigment inks are typically used from the viewpoint of improving the light resistance and water resistance of images. It is known that, in the images recorded on recording media by using the pigment ink, color luster different from the color of a pigment itself may be observed depending on an observation angle, or what is referred to as a bronzing phenomenon is likely to be caused. The bronzing phenomenon is caused due to wavelength dependency of the refractive index on the particle surface of a pigment on a recording medium. From the viewpoint of improving the quality of images recorded with a pigment ink, there is a demand for the reduction of the bronzing phenomenon (the improvement of bronzing resistance). To solve such technical problems as above, an ink containing a resin particle is disclosed, for example (see Japanese Patent Application Laid-Open No. 2011-074321). In order to improve ejection performance in the ink jet recording method, an ink containing a polysaccharide is disclosed (see Japanese Patent Application Laid-Open No. 2005-179482).

As a result of studies, the inventors of the present invention have revealed that even when the inks disclosed in Japanese Patent Application Laid-Open No. 2011-074321 and Japanese Patent Application Laid-Open No. 2005-179482 are used, it is difficult to satisfy both the abrasion resistance of images recorded on recording media such as plain papers and the bronzing resistance of images recorded on recording media such as coated papers.

SUMMARY OF THE INVENTION

In view of the above circumstances, an object of the present invention is to provide an aqueous ink enabling the recording of images having excellent abrasion resistance and bronzing resistance. The present invention is also directed to provide an ink cartridge and an ink jet recording method using the aqueous ink.

The above objects are achieved by the following present invention. In other words, the present invention provides an aqueous ink for ink jet including a pigment and a resin, wherein the pigment is impregnated with a compound having a structure in which at least two structures each represented by General Formula (1) are bonded by a glycoside bond.

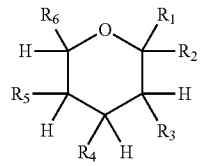

(In General Formula (1), each of $R_1$ to $R_6$ is independently a hydrogen atom, a methyl group, a phosphonic acid group, —$(CH_2)_x$—OH, —$(OCH(CH_3))_y$—COOH, —NH$(COCH_2)_z$—H, —OCOCH$_2$CH(OCOCH$_2$(OH)C$_{11}$H$_{22}$CH$_3$)C$_{10}$H$_{20}$CH$_3$, or —NHCOCH$_2$CH(OC$_{11}$H$_{22}$CH$_3$)C$_{10}$H$_{20}$CH$_3$, and at least one of $R_1$ and $R_2$ is a hydroxy group; and each of x, y, and z is independently a number from 0 or more to 6 or less)

According to the present invention, an aqueous ink enabling the recording of images having excellent abrasion resistance and bronzing resistance can be provided. According to the present invention, an ink cartridge and an ink jet recording method using the aqueous ink can also be provided.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
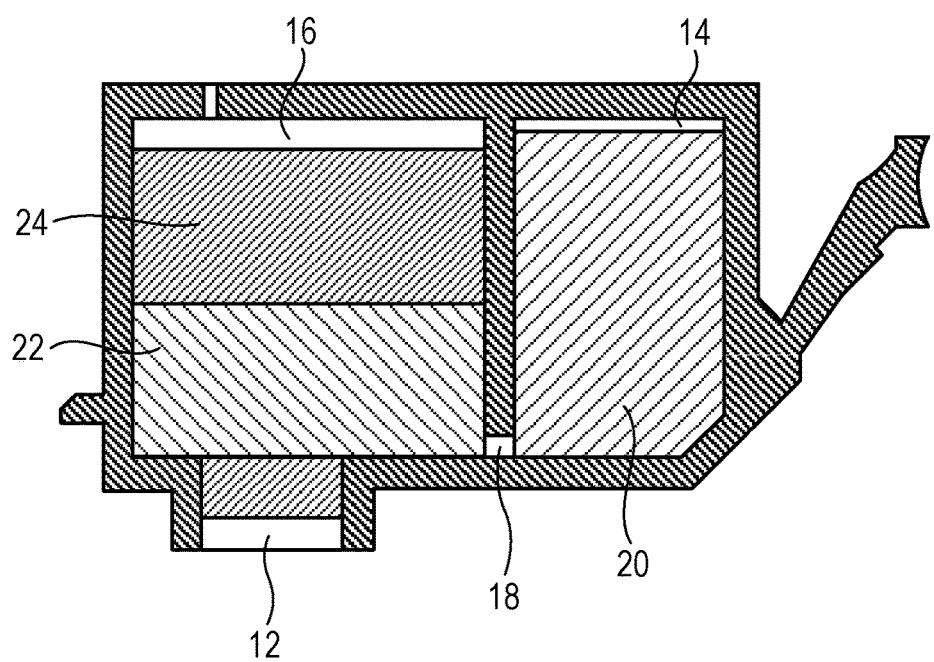
FIG. 1 is a schematic sectional view illustrating an exemplary ink cartridge of the present invention.

Preferred embodiments of the present invention will now be described in detail in accordance with the accompanying drawings.

The present invention will now be described in detail with reference to preferred embodiments. In the present invention, if a compound is a salt, the salt dissociates into ions in an ink, but such an ink is expressed as "containing a salt" for convenience. An aqueous ink for ink jet is also simply referred to as "ink". The "unit" relating to resins is a minimum repeating unit constituting a resin, and means a structure formed by (co)polymerization of a single type of monomer. Physical property values are values determined at normal temperature (25° C.) unless otherwise noted.

An ink of the present invention is specifically characterized by containing a pigment that is impregnated with a compound having a structure in which at least two structures each represented by General Formula (1) are bonded by a glycoside bond (hereinafter also referred to as "polysaccharide compound"). In the present specification, "pigment being impregnated with a compound" means that a plurality of primary particles of a pigment assemble to form secondary particles (pigment aggregate) having pores therein in which pores a compound is present. Hence, compounds adhering to the surface of pigment particles present in an ink are not included in the concept of the "compound with which a pigment is impregnated", regardless of whether the pigment is present as primary particles or secondary particles in an ink. Hereinafter, compounds other than the "compounds with which a pigment is impregnated" may also be expressed as "compound present in a free state".

The inventors of the present invention have studied why both the abrasion resistance and the bronzing resistance of images are difficult to achieve. In order to improve the abrasion resistance of an image, it is supposed that a binding component such as a resin is required to be present on the particle surface of a pigment without uneven distribution. The ink disclosed in Japanese Patent Application Laid-Open No. 2011-074321 contains a pigment and a resin particle. When the ink is applied to a recording medium, a liquid component evaporates and infiltrates to cause a vigorous flow in droplets of the ink. The pigment and the resin particle are independently dispersed, thus the flow causes uneven distribution in a droplet of the ink, and consequently the uniformity of an image is impaired. In addition, uneven distribution of a resin particle causes uneven abrasion resistance on an image.

In order to suppress the bronzing phenomenon, it is supposed that the wavelength dependency of the refractive index is required to be suppressed on the particle surface of a pigment. In the case of the inks disclosed in Japanese Patent Application Laid-Open No. 2011-074321 and Japanese Patent Application Laid-Open No. 2005-179482, each of the resin and the pigment independently tends to be distributed unevenly, and thus the bronzing phenomenon is unlikely to be suppressed. In an ink in which a pigment is not impregnated with a polysaccharide compound but the polysaccharide compound is present in a free state in the ink, the polysaccharide compound is not considered to be incorporated into pores in secondary particles of the pigment. This is thought to be due to steric hindrance or other effects of the polysaccharide compound.

The inventors of the present invention have studied such conditions that a pigment is not unevenly distributed even by a vigorous flow generated after the application of an ink to a recording medium. The result has indicated that it is important to allow a pigment and a recording medium to interact uniformly. Next, the inventors have studied such conditions that the wavelength dependency of the refractive index is suppressed on the particle surface of a pigment. The result has indicated that it is important to allow the particle surface of a pigment and a resin component to interact uniformly. In addition, it has been revealed that for the uniform interaction between a pigment and a recording medium and the uniform interaction between the particle surface of a pigment and a resin component, the use of a pigment impregnated with a polysaccharide compound is required.

The inventors of the present invention suppose the following mechanism to enable the recording of images having excellent abrasion resistance and bronzing resistance by using such constitution as above. When an ink is applied to a recording medium, a liquid component evaporates and infiltrates, and thus the flow rate of the liquid component increases outside the pigment. This causes elution of the polysaccharide compound with which a pigment is impregnated from the pigment in accordance with Bernoulli's theorem (the principle of an aspirator). The polysaccharide compound eluted from the pigment forms hydrogen bonds with respect to cellulose constituting a recording medium. Consequently, the pigment is evenly placed on the recording medium.

In addition, the liquid component in the ink applied to a recording medium evaporates and infiltrates in accordance with the same mechanism as the above independent of the type of recording medium, and thus the polysaccharide compound with which a pigment is impregnated is eluted from the pigment. In an ink containing a resin, the polysaccharide compound eluted from the pigment thus forms hydrogen bonds with respect to a typical bond of the resin, such as an ester bond, a urethane bond, an amide bond, and an ether bond. Consequently, the resin is evenly placed on a recording medium, and the binder effect of the resin is evenly exerted. In addition, the resin is also evenly placed on the particle surface of the pigment. Hence, the wavelength dependency of the refractive index is suppressed on the particle surface of a pigment. Due to these effects, images having further excellent abrasion resistance and bronzing resistance are thought to be recorded.

In other words, it is important in the present invention that the polysaccharide compound with which a pigment is impregnated in an ink is eluted from the pigment after the application of the ink to a recording medium, to cause the interaction between the polysaccharide compound and the recording medium and between the polysaccharide compound and the resin.

Aqueous Ink

The ink of the present invention is an aqueous ink for ink jet containing a pigment and a resin. The pigment is impregnated with a compound having a structure in which at least two structures each represented by General Formula (1) are bonded by a glycoside bond (polysaccharide compound). Hereinafter, components constituting the ink of the present invention, physical properties of the ink, and the like will be described in detail.

Polysaccharide Compound

The pigment contained in the ink of the present invention is impregnated with what is referred to as a polysaccharide compound having a structure in which at least two structures each represented by General Formula (1) are bonded by a glycoside bond. This polysaccharide compound preferably has a structure in which at least two structures each represented by General Formula (1) are condensed between hydroxy groups of the at least two structures. The condensation between hydroxy groups is preferably a dehydration condensation.

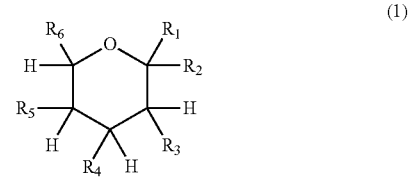

(1)

In General Formula (1), each of $R_1$ to $R_6$ is independently a hydrogen atom, a methyl group, a phosphonic acid group, —$(CH_2)_x$—OH, —$(OCH(CH_3))_y$—COOH, —NH(COCH$_2$)$_z$—H, —OCOCH$_2$CH(OCOCH$_2$(OH)C$_{11}$H$_{22}$CH$_3$)C$_{10}$H$_{20}$CH$_3$, or —NHCOCH$_2$CH(OC$_{11}$H$_{22}$CH$_3$)C$_{10}$H$_{20}$CH$_3$, and at least one of $R_1$ and $R_2$ is a hydroxy group; and each of x, y, and z is independently a number from 0 or more to 6 or less.

Each of x, y, and z is independently a number from 0 or more to 6 or less. The group represented by —$(CH_2)_x$—OH is preferably —OH (hydroxy group), —$CH_2$—OH, —$(CH_2)_2$—OH, —$(CH_2)_3$—OH, and the like, and is more preferably —OH (hydroxy group), —$CH_2$—OH, and the like. The group represented by —$(OCH(CH_3))_y$—COOH is preferably —OCH(CH$_3$)—COOH, and the like. The group represented by —NH(COCH$_2$)$_z$—H is preferably —NHCOCH$_3$, and the like.

The structure represented by General Formula (1) is preferably exemplified by structures a to k shown in Table 1. The relations between the structures represented by General Formula (1) and polysaccharide compounds are shown in Table 2. For example, "xanthan gum" in Table 2 is a compound having the structure in which structures derived from glucose, mannose, and glucuronic acid are bonded by a glycoside bonds between hydroxy groups of the respective structures. Needless to say, the present invention is not limited to the exemplified structures and the polysaccharide compounds shown below and includes any structures and any compounds having the structure of General Formula (1) and satisfying the definition of the compound.

glucose, galactose, mannose, glucuronic acid, xylose, glucosamine, N-acetylglucosamine, N-acetylgalactosamine, neuraminic acid, N-acetylneuraminic acid, muramic acid, N-acetylmuramic acid, and lipid A is preferably used. As the polysaccharide compound, at least one polysaccharide compound selected from the group consisting of dextran, arabinoxylan, xanthan gum, guar gum, hyaluronic acid, gellan gum, ganglioside, peptidoglycan, and lipopolysaccharide is preferably used.

The polysaccharide compound preferably has a carboxylic acid group. In an ink containing a resin, a carboxylic acid group can form a hydrogen bond with a typical bond of the resin, such as an ester bond, a urethane bond, an amide bond, and an ether bond, and thus the abrasion resistance of an image can be further improved.

TABLE 1

Structure examples represented by General Formula (1)

| Structure | Combination of R$_1$ and R$_2$ | | R$_3$ | R$_4$ | R$_5$ | R$_6$ |
|---|---|---|---|---|---|---|
| a | Hydrogen atom | Hydroxy group | Hydroxy group | Hydroxy group | Hydroxy group | Hydrogen atom |
| b | Hydrogen atom | Hydroxy group | Hydroxy group | Hydroxy group | Hydroxy group | Hydrogen atom |
| c | Hydrogen atom | Hydroxy group | Hydroxy group | Hydroxy group | Hydroxy group | Hydrogen atom |
| d | Hydrogen atom | Hydroxy group | Hydroxy group | Hydroxy group | Hydroxy group | Hydrogen atom |
| e | Hydrogen atom | Hydroxy group | Amino group | Hydroxy group | Hydroxy group | Hydrogen atom |
| f | Hydrogen atom | Hydroxy group | NHCOCH$_3$ | Hydroxy group | Hydroxy group | Hydrogen atom |
| g | Hydrogen atom | Hydroxy group | Hydrogen atom | Hydroxy group | Amino group | Hydrogen atom |
| h | Hydrogen atom | Hydroxy group | Hydrogen atom | Hydroxy group | NHCOCH$_3$ | Hydrogen atom |
| i | Hydrogen atom | Hydroxy group | Amino group | OCH(CH$_3$)COOH | Hydroxy group | Hydrogen atom |
| j | Hydrogen atom | Hydroxy group | NHCOCH$_3$ | OCH(CH$_3$)COOH | Hydroxy group | Hydrogen atom |
| k | Hydrogen atom | Hydroxy group | (*1) | (*2) | Phosphonic acid group | Hydrogen atom |

(*1) NHCOCH$_2$CH(OC$_{11}$H$_{22}$CH$_3$)C$_{10}$H$_{20}$CH$_3$
(*2) OCOCH$_2$CH(OCOCH$_2$(OH)C$_{11}$H$_{22}$CH$_3$)C$_{10}$H$_{20}$CH$_3$

TABLE 2

Relation between structure represented by General Formula (1) and polysaccharide compound

| | | | Polysaccharide compound | | | | | | | |
|---|---|---|---|---|---|---|---|---|---|---|
| | | | Dextran | Arabinoxylan | Xanthan gum | Guar gum | Hyaluronic acid | Gellan gum | Ganglioside (GQ1b) | Peptidoglycan | Lipopolysaccharide |
| Structure | a | Rhamnose | | | | | | | ○ | | |
| | b | Glucose | ○ | | ○ | | | ○ | | | |
| | | Galactose | | | | ○ | | | ○ | | |
| | | Mannose | | | ○ | ○ | | | | | |
| | c | Glucuronic acid | | | ○ | | ○ | ○ | | | |
| | d | Xylose | | ○ | | | | | | | |
| | e | Glucosamine | | | | | | | ○ | | |
| | f | N-acetylglucosamine | | | | | | | | ○ | ○ |
| | | N-acetylgalactosamine | | | | | | | ○ | | |
| | g | Neuraminic acid | | | | | | | | | |
| | h | N-acetylneuraminic acid | | | | | | | ○ | | |
| | i | Muramic acid | | | | | | | | | |
| | j | N-acetylmuramic acid | | | | | | | | ○ | ○ |
| | k | Lipid A | | | | | | | | | ○ |

The polysaccharide compound can be synthesized by, for example, polymerization through glycosylation reaction of two or more compounds having the structure represented by General Formula (1). The glycosylation reaction is exemplified by glycosylation reaction in terms of organic chemistry and glycosylation reaction using a glycosyltransferase.

As the compound having the structure represented by General Formula (1) (monosaccharide), at least one compound selected from the group consisting of rhamnose, The amount of the polysaccharide compound with which the pigment is impregnated is preferably 1 ppm or more to 4,500 ppm or less in terms of mass ratio to the amount of the pigment. When the mass ratio is less than 1 ppm, a smaller amount of the polysaccharide compound is eluted from the pigment after the application of an ink to a recording medium. This weakens the interaction between the polysaccharide compound eluted and a recording medium or between the polysaccharide compound and a resin, resulting in insufficient abrasion resistance and bronzing resistance of images in some cases. When the mass ratio is 4,500 ppm or more, the polysaccharide compound is likely to be eluted from the pigment in an ink stored for a long time. Hence, the ejection stability is insufficiently achieved, and the ink is unevenly applied to a recording medium, resulting in insufficient abrasion resistance of images in some cases.

The content (ppm) of the polysaccharide compound with which the pigment is impregnated is preferably 90% or more in terms of mass ratio to the total content (ppm) of the polysaccharide compound in an ink. The total content (ppm) of a polysaccharide compound in an ink means the sum of the amount of the polysaccharide compound with which a pigment is impregnated and the amount of the polysaccharide compound present in a free state in the ink. In other words, it is preferred that with almost all the polysaccharide compound the pigment is impregnated, the polysaccharide compound not being present in the ink in a free state. When the mass ratio is less than 90%, the free polysaccharide compound interacts with a resin in the ink, and a recording medium is unlikely to interact with the polysaccharide compound, resulting in insufficient abrasion resistance and bronzing resistance in some cases. The mass ratio is preferably 100% or less.

The content (ppm) of the polysaccharide compound present in a free state in an ink is preferably 25 ppm or less based on the total mass of the ink. When the content of the polysaccharide compound present in a free state is more than 25 ppm, the ink viscosity increases upon evaporation of a liquid component, resulting in insufficient ejection stability in some cases. The lower limit of the content of the polysaccharide compound present in a free state can be 0 ppm.

The polysaccharide compound preferably has a weight-average molecular weight of 20,000 or more to 2,200,000 or less and more preferably 20,000 or more to 2,000,000 or less. The weight-average molecular weight of a polysaccharide compound is a value determined by gel permeation chromatography (GPC) in terms of polystyrene. When the weight-average molecular weight of a polysaccharide compound is more than 2,200,000 and the content of a polysaccharide compound present in a free state in an ink is more than 25 ppm, the polysaccharide compound is likely to adhere to a filter in an ink supply line. Hence, the ink supply performance to a recording head is likely to deteriorate in some cases. The weight-average molecular weight of a polysaccharide compound may be adjusted by a chemical treatment including hydrolysis or a physical treatment including sonication.

Analysis of Polysaccharide Compound

The analytical method of a polysaccharide compound in an ink will be described with reference to examples. Whether a pigment is impregnated with a polysaccharide compound can be determined by, for example, phenol-sulfuric acid method, kinetic colorimetric assay (toxinometer method: correlation of color change by reaction with a particular substance), and HPLC using a column for sugar analysis. The analytical method using a toxinometer (toxinometer method), which is a simple method, will next be described. The toxinometer method is an endotoxin measurement method capable of generally detecting compounds including metabolites of fungi, such as polysaccharides, at high sensitivity.

First, a liquid A containing an appropriate amount of a pigment is prepared. Then, a toxinometer is used to determine the total amount a of a polysaccharide compound present in the liquid A. Next, the polysaccharide compound present in a free state in the liquid A are removed. Specifically, the liquid A is subjected to ultrafiltration through a hollow fiber membrane having a cutoff molecular weight of about 100 kDa and is separated into a liquid B containing the pigment and a filtrate. The presence or absence of the polysaccharide compound in the filtrate is analyzed by phenol-sulfuric acid method, and when a filtrate is discolored, ultrafiltration is repeated until the filtrate is not discolored. Then, a toxinometer is used to determine the total amount b of the polysaccharide compound present in the liquid B. The amount of the polysaccharide compound with which the pigment is impregnated corresponds to "b". The amount of the polysaccharide compound present in a free state in the liquid A corresponds to "a-b". For example, when the value "a" is more than 0 and the value "b" is 0, a pigment is not impregnated with a polysaccharide compound but the polysaccharide compound is present in a free state in the liquid A.

A polysaccharide compound can be identified by liquid chromatography, for example. To identify the polysaccharide compound with which a pigment is impregnated, the pH of a liquid containing the pigment is first adjusted to about 12.0, which is strong alkaline. The liquid is then heated to about 80° C. and is maintained for about 2 hours. By this operation, the polysaccharide compound can be eluted from the pigment. Next, the liquid is subjected to ultrafiltration to give a filtrate containing the polysaccharide compound, then the filtrate is analyzed by liquid chromatography or the like, and the polysaccharide compound with which the pigment is impregnated can be identified. The pH of a liquid containing a pigment can be adjusted by using an aqueous solution of an alkali metal hydroxide such as potassium hydroxide. The ultrafiltration can be performed by using a hollow fiber membrane having a cutoff molecular weight of about 70 kDa.

Method of Impregnating Pigment with Polysaccharide Compound

For example, the following step (i) can be performed to impregnate a pigment with a polysaccharide compound. When a pigment is impregnated with an excess amount of a polysaccharide compound after the step (i), the following steps (ii) to (v) can be further performed to control the amount of the polysaccharide compound with which the pigment is impregnated. When an excess amount of a polysaccharide compound is present in a free state after the step (i), at least one of the following steps (iii) to (v) can be further performed to remove the polysaccharide compound present in a free state. As needed, some of the steps (iii) to (v) can be performed, and the order of steps can be appropriately changed. After the final step, a purification step may be further performed. Each of the steps (i) to (v) will next be described.

Step (i): A pigment is impregnated with a polysaccharide compound.

Step (ii): The polysaccharide compound is released from the pigment.

Step (iii): Of the components derived from the polysaccharide compound released from the pigment, components having a smaller size than that of the pigment are removed.

Step (iv): Of the components derived from the polysaccharide compound released from the pigment, components having a larger size than that of the pigment are removed.

Step (v): The alkali component or the acid component used in step (ii) is removed.

Step (i)

To impregnate a pigment with a polysaccharide compound, the polysaccharide compound itself can be used, or a fungus (including Gram-positive bacteria and Gram-negative bacteria) that produces the polysaccharide compound through metabolism can also be used. For example, a crude pigment is kneaded with a component containing at least one of a polysaccharide compound and a fungus capable of producing a polysaccharide compound, and then the mixture is pulverized. Such a step can be performed by a common process for pulverizing a crude pigment. As needed, the mixture can be maintained in conditions for cultivating fungi, and thus the pigment can be impregnated with the polysaccharide compound.

A crude pigment, a polysaccharide compound or a fungus, and a liquid medium (for example, water, an organic solvent, or a mixed medium thereof) are kneaded to give a kneaded mixture. The resulting kneaded mixture has almost no flowability. Raw materials are preferably kneaded in such conditions as to give a kneaded mixture having a solid content of about 80% by mass or more. When a kneaded mixture has a high solid content, the kneaded mixture keeps an appropriately high viscosity during kneading, and thus a high shear stress is applied to the kneaded mixture. This condition enables efficient pulverization of the crude pigment and efficient impregnation of the pigment with the polysaccharide compound. When a kneaded mixture has a solid content of less than 80% by mass, the kneaded mixture has a low viscosity, and thus the pulverization degree of the pigment may be slightly insufficient. In addition, the pigment may not be highly efficiently impregnated with the polysaccharide compound. In order to stably maintain a high viscosity of a kneaded mixture, a closed type kneader such as a twin-screw kneading extruder is preferably used.

When a polysaccharide compound itself is used, the polysaccharide compound can be previously treated into an amorphous state. The amorphous compound is easily dissolved in a liquid medium and thus a pigment can be more efficiently impregnated therewith. When a fungus is used, a kneaded mixture is preferably maintained in the conditions for cultivating the fungus to impregnate the pigment with a polysaccharide compound to be the metabolite. In this case, a kneaded mixture can be maintained in a cultivation condition, or a kneaded mixture can be treated into a wet state, for example, as a wet cake and then can be maintained in a cultivation condition. During the maintenance, the temperature is preferably 15 to 40° C., the relative humidity is preferably 20 to 30%, and the maintenance time is preferably 1 to 3 months. When a fungus is used, the fungus after the production of a polysaccharide compound becomes unnecessary and thus is preferably inactivated. The process for inactivation of a fungus is exemplified by heat treatment; ozone treatment; and treatment with an antifungal agent such as benzisothiazolin-3-one, isocyanuric acid, and imazalil. After the step (i), a typical dispersion treatment for dispersing a pigment can be performed. The steps (ii) to (v) can be performed regardless of whether the dispersion treatment is performed. When at least one of the steps (ii) to (v) is performed, a typical dispersion treatment for dispersing a pigment can be performed subsequent to the steps.

Step (ii)

The step (ii) is a step of releasing the polysaccharide compound from the pigment. The step (ii) is performed when a pigment is impregnated with an excess amount of a polysaccharide compound or an excess amount of a polysaccharide compound is present in a free state. In the step (ii), the polysaccharide compound is released from the pigment, and concurrently the released polysaccharide compound is modified or hydrolyzed to facilitate the step (iii) or the step (iv). The polysaccharide compound can be modified or hydrolyzed by alkali treatment or acid treatment. A typical polysaccharide compound is present while maintaining a hairpin loop structure. A polysaccharide compound that has been modified to lose the hairpin loop structure turns into low molecular compounds having a smaller volume or turns into a gel having a larger volume. A polysaccharide compound is hydrolyzed into low molecular compounds having a smaller volume. By using the difference in size between a pigment and components generated by modification or hydrolysis of a polysaccharide compound, the step (iii) or the step (iv) is performed to remove such components.

To subject a polysaccharide compound to an alkali treatment, a liquid containing an alkali component can be added to and mixed with a liquid containing a pigment, for example. In order to improve the efficiency of the modification or the hydrolysis of a polysaccharide compound, the pH of the liquid after mixing is preferably increased as much as possible. Specifically, the liquid after mixing preferably has a pH of 10.0 or more and more preferably 12.0 or more. The liquid after mixing preferably has a pH of 13.5 or less. In order to accelerate the modification or the hydrolysis of the polysaccharide compound, the liquid after mixing is next heated. The temperature is preferably 60° C. or more and more preferably 80° C. or more. The temperature is preferably 100° C. or less.

The polysaccharide compound has a pKa of about 12.0 to 13.0. Hence, when a liquid prepared by adding and mixing a liquid containing an alkali component has a pH of 12.0, about half of the polysaccharide compound dissociates. For example, the pKa of a liquid heated at 80° C. or more is lowered, and thus substantially the whole polysaccharide compound dissociates. By maintaining the liquid in this condition for a certain time, substantially the whole polysaccharide compound present in a free state can be modified or hydrolyzed. When the liquid is maintained in the above conditions for a longer time, the polysaccharide compound with which the pigment is impregnated can be released and modified or hydrolyzed.

To subject a polysaccharide compound to an acid treatment, a liquid containing an acid component can be added to and mixed with a liquid containing a pigment, for example. In order to improve the efficiency of the modification or the hydrolysis of a polysaccharide compound, the pH of the liquid after mixing is preferably reduced as much as possible. Specifically, the liquid after mixing preferably has a pH of 6.0 or less and more preferably 4.0 or less. The liquid after mixing preferably has a pH of 2.0 or more. In order to accelerate the modification or the hydrolysis of the polysaccharide compound, the liquid after mixing is next heated. The temperature is preferably 40° C. or more and more preferably 60° C. or more. The temperature is preferably 100° C. or less.

In the case of the acid treatment, the hydrolysis is markedly accelerated by heating, and thus the heating temperature can be set at a lower temperature than that for the alkali treatment. However, a typical resin used as the dispersant of a pigment has an anionic group, and thus may be hydrolyzed by the acid treatment or precipitated by an acid, for example. Hence, the acid treatment is preferably, carefully performed. The heating time for the alkali treatment or the acid treatment can be appropriately set depending on the amount of a pigment used or the type of a stirrer, for example. The heating is preferably performed for a time sufficient for the treatment of a pigment. Specifically, the heating time is preferably 5 to 240 minutes.

Examples of the alkali component include hydroxides of alkali metals such as lithium, sodium, and potassium; and hydroxides of alkaline earth metals such as strontium and barium. Examples of the acid component include inorganic acids such as hydrochloric acid, sulfuric acid, and nitric acid; and organic acids such as phthalic acid and methanesulfonic acid. An aqueous solution prepared by dissolving such an alkali component or an acid component in water can be used. The content (% by mass) of an alkali component or an acid component in an aqueous solution can be such a content as to give an intended pH, and is preferably 0.1% by mass or more to 3.0% by mass or less based on the total mass of an aqueous solution. The mixing ratio of a pigment and an aqueous solution can be such a ratio that the pigment be sufficiently immersed in the aqueous solution, and is preferably pigment:aqueous solution=1:1 to 1:10 in terms of mass ratio, for example.

Step (iii)

In the step (iii), of the components derived from the polysaccharide compound released in the step (ii), components having a smaller size than that of the pigment are removed from a liquid containing the pigment. Specifically, of the components derived from the polysaccharide compound, components having a smaller size than that of the pigment can be removed by ultrafiltration, filter pressing, disk filtering, centrifugation, or the like. For example, when the polysaccharide compound is treated so as to become components having a size of about 30 nm or less in the step (ii), a separation membrane having a pore size of 50 nm or less or a separation membrane having a cutoff molecular weight of 500 kDa or less, preferably 100 kDa or less, can be used. In order to prevent a resin used as the dispersant from being removed together with the components derived from the polysaccharide compound, it is preferable that a separation membrane do not have an excessively large pore size or an excessively large cutoff molecular weight.

Step (iv)

In the step (iv), of the components derived from the polysaccharide compound released in the step (ii), components having a larger size than that of the pigment are removed from a liquid containing the pigment. Specifically, of the components derived from the polysaccharide compound, components having a larger size than that of the pigment can be removed by microfiltration, for example. As the filter material, a filter paper, a membrane filter, and a glass fiber filter can be used, for example.

Step (v)

In the step (v), the alkali component or the acid component used in the step (ii) is removed from the liquid containing the pigment. The removal method is not limited to particular methods, and a known method can be used. For example, a separation method exemplified in the step (iii), such as ultrafiltration, filter pressing, disk filtering, and centrifugation, can be performed once or more. In the case of centrifugation, a liquid to be treated is placed in a centrifuge tube and is centrifuged to settle the pigment, and a supernatant liquid is removed. Next, a liquid such as water is added into and mixed with the settled pigment. In the case of ultrafiltration, the filtrate containing an alkali component or an acid component is removed, and water is added in the same amount as that of the removed filtrate. By repeating such a process as needed, the alkali component or the acid component is removed, and the pH of a liquid containing the pigment can be appropriately adjusted. In addition to the above methods, a method of utilizing salt formation by neutralization (a method in which an acid component is added to the liquid containing a pigment and an alkali component to form a salt and the salt is removed to appropriately adjust the pH of the liquid) and a method of using an ion exchange resin to remove an alkali component or an acid component can also be used.

Pigment

The ink of the present invention contains a pigment as a coloring material. The pigment is exemplified by inorganic pigments such as carbon black and organic pigments that are known in the art. Specifically, carbon black or an organic pigment is preferably used. The content (% by mass) of the pigment in the ink is preferably 0.1% by mass or more to 15.0% by mass or less and more preferably 1.0% by mass or more to 10.0% by mass or less based on the total mass of the ink.

The dispersion manner of the pigment is not limited to particular manners. For example, a resin-dispersed pigment with a resin as the dispersant or a self-dispersible pigment in which the particle surface of a pigment is bonded to a hydrophilic group can be used. In addition, a resin-bonded pigment in which the particle surface of a pigment is chemically bonded to an organic group containing a resin or a microcapsule pigment in which the particle surface of a pigment is covered with a resin or the like can also be used, for example. The resin used as the dispersant of a pigment is preferably a non-crosslinked resin. In the ink, pigments different in dispersion manner may be used in combination. Specifically preferred are (i) a self-dispersible pigment in which an anionic group is bonded directly or through another atomic group to the particle surface of the pigment and (ii) a resin-dispersed pigment in which a resin being the dispersant is physically adsorbed onto the particle surface of the pigment and the resin functions to disperse the pigment.

From the viewpoint of improving the optical density of an image, the self-dispersible pigment (i) is preferably used. In this case, the resin for dispersing a pigment is basically unnecessary, and thus a resin is not used as the resin dispersant but is used as an additional resin. From the viewpoint of improving the abrasion resistance and the bronzing resistance of an image, the resin-dispersed pigment (ii) is preferably used. When a resin (resin dispersant) is used for dispersing a pigment, a resin different from the resin dispersant (additional resin) is preferably contained in the ink. The bond of the additional resin, such as an ester bond, a urethane bond, an amide bond, and an ether bond, is preferably used to form hydrogen bonds with respect to a polysaccharide compound as described above. The difference between a resin dispersant and an additional resin means a difference in at least one of the type, the ratio of constitutional units and physical properties of resins including acid value and weight-average molecular weight. A resin dispersant and an additional resin can be slightly exchanged in an ink in a common pH range and surface tension range of an aqueous ink, which will be specifically described later. The amount is, however, extremely small, and thus such a phenomenon is negligible.

Resin Dispersant

The ink of the present invention can contain a resin dispersant as the dispersant for dispersing a pigment in an aqueous medium. As the resin dispersant, a dispersant having an anionic group that enables a pigment to be dispersed in an aqueous medium is preferably used. The resin dispersant is exemplified by acrylic resin dispersants, urethane resin dispersants, and urea resin dispersants. Of them, acrylic resins are preferred, and an acrylic resin having a hydrophilic unit and a hydrophobic unit as constitutional units is more preferred.

The hydrophilic unit is a unit having a hydrophilic group such as an acid group and a hydroxy group. The hydrophilic unit can be formed by polymerizing a hydrophilic monomer having a hydrophilic group, for example. Specific examples of the hydrophilic monomer having a hydrophilic group include anionic monomers including acidic monomers having a carboxylic acid group, such as (meth)acrylic acid, itaconic acid, maleic acid, and fumaric acid and anhydrides and salts of these acidic monomers; monomers having a hydroxy group, such as 2-hydroxyethyl (meth)acrylate and 3-hydroxypropyl (meth)acrylate; and monomers having an ethylene oxide group, such as methoxy(mono, di, tri, and poly)ethylene glycol (meth)acrylates. Examples of the cation constituting the salt of an acidic monomer include a lithium ion, a sodium ion, a potassium ion, an ammonium ion, and organic ammonium ions.

The hydrophobic unit is a unit not having a hydrophilic group such as an acid group and a hydroxy group. The hydrophobic unit can be formed by polymerizing a hydrophobic monomer not having a hydrophilic group such as an acid group and a hydroxy group, for example. Specific examples of the hydrophobic monomer include monomers having an aromatic ring, such as styrene, α-methylstyrene, and benzyl (meth)acrylate; and (meth)acrylate monomers such as ethyl (meth)acrylate, methyl (meth)acrylate, (iso) propyl (meth)acrylate, (n-, iso-, t-)butyl (meth)acrylates, and 2-ethylhexyl (meth)acrylate.

The resin dispersant preferably has a hydrophilic unit derived from (meth)acrylic acid and a hydrophobic unit derived from a monomer having an aliphatic group or an aromatic ring. The resin dispersant more preferably has a hydrophilic unit derived from (meth)acrylic acid and a hydrophobic unit derived from at least one monomer of styrene and α-methylstyrene. Such a resin dispersant is likely to interact particularly with a pigment and thus is preferred.

The resin dispersant preferably has a weight-average molecular weight of 1,000 or more to 30,000 or less and more preferably 3,000 or more to 15,000 or less. The weight-average molecular weight of a resin dispersant is a value determined by gel permeation chromatography (GPC) in terms of polystyrene. The resin dispersant preferably has an acid value of 80 mg KOH/g or more to 250 mg KOH/g or less and more preferably 100 mg KOH/g or more to 200 mg KOH/g or less. The content (% by mass) of the resin dispersant in the ink is preferably 0.1% by mass or more to 5.0% by mass or less and more preferably 0.5% by mass or more to 2.0% by mass or less based on the total mass of the ink. Specifically, the content is particularly preferably 0.5% by mass or more to 1.0% by mass or less. The content (% by mass) of the resin dispersant in the ink, in terms of mass ratio to the content (% by mass) of the pigment is preferably 0.05 time or more to 0.50 time or less and more preferably 0.10 time or more to 0.30 time or less.

Resin

The ink of the present invention contains a resin. The resin can be either a water-soluble resin soluble in an aqueous medium or a water-dispersible resin (water-insoluble resin) dispersible as particles in an aqueous medium. As the resin, a resin having at least one bond selected from the group consisting of an ester bond, a urethane bond, an amide bond, and an ether bond is preferably used. Specifically, a resin having an ester bond or a urethane bond is preferably used. At least one of a urethane resin, a block copolymer, and a resin particle is preferably used because a resulting image is likely to have higher abrasion resistance and bronzing resistance. At least two of a urethane resin, a block copolymer, and a resin particle are more preferably used, and all of these three types are particularly preferably used. When a resin dispersant is used for dispersing a pigment, "resin" described in this section means "additional resin". The content (% by mass) of the resin in the ink is preferably 0.5% by mass or more to 20.0% by mass or less and more preferably 1.0% by mass or more to 15.0% by mass or less based on the total mass of the ink. Specifically, the content is particularly preferably 1.0% by mass or more to 10.0% by mass or less.

Resin Having Ester Bond

The ester bond is exemplified by a carboxylic acid ester group, a sulfonic acid ester group, a phosphoric acid ester group, and a phosphoric acid ester group, and specifically, a carboxylic acid ester group is preferred. The resin including a unit having an ester bond (preferably an acrylic resin) is referred to as "resin having an ester bond". As the resin having an ester bond, a resin having a unit derived from a (meth)acrylic acid ester is preferably used. A resin having a unit derived from a (meth)acrylic acid ester is preferably used because a wide variety of (meth)acrylic acid esters can be chosen and physical properties such as molecular weight are easily controlled.

The (meth)acrylic acid ester can be known (meth)acrylic acid esters including linear or branched esters having an alkyl chain with 1 to 12 carbon atoms, such as methyl (meth)acrylate and 2-ethylhexyl (meth)acrylate; esters having an aromatic ring, such as benzyl (meth)acrylate; esters having a cycloalkyl with 3 to 18 carbon atoms, such as cyclohexyl (meth)acrylate; esters having a hydroxy group, such as 2-hydroxyethyl (meth)acrylate; esters having an amino group, such as N,N-dimethylaminoethyl (meth)acrylate; dimethylsiloxane structure-containing esters (for example, trade name "Silaplane" series (manufactured by JNC)); fluorine-atom-containing esters (for example, trade name "CHEMINOX" series (manufactured by Unimatec)); and polyfunctional esters such as ethylene di(meth)acrylate.

As the resin having an ester bond, copolymers of a plurality of (meth)acrylic acid esters and copolymers of a (meth)acrylic acid ester and a monomer other than the (meth)acrylic acid ester can also be used. As the monomer other than the (meth)acrylic acid ester, any known monomer can be used. Specifically, an acid monomer is preferably used from the viewpoint of imparting water-solubility or water-dispersibility to a resin.

The resin having an ester bond usable in an aqueous ink for ink jet is typically classified in terms of unit sequence into a random copolymer, a block copolymer, and a graft copolymer, and classified in terms of hydrophilicity into a water-soluble resin and a water-dispersible resin (resin particle). The resin having an ester bond is preferably a block copolymer rather than a random copolymer or a graft copolymer. When such a preferable block copolymer used interacts with a pigment through a polysaccharide compound eluted from the pigment, a block having high affinity with the particle surface of the pigment is selectively aligned on the particle surface of the pigment. As a result, the particle surface of the pigment is covered with the block copolymer to form a thin-film-like condition, and thus the occurrence of the bronzing phenomenon can be more effectively suppressed. In addition, the resin having an ester bond is preferably a water-dispersible resin (resin particle) rather than a water-soluble resin. When such a preferable resin particle used interacts with a pigment through a polysaccharide compound eluted from the pigment, the resin particle having large binder effect is placed between pigment particles. This can further improve the abrasion resistance of an image.

The classification in terms of unit sequence and the classification in terms of hydrophilicity may overlap. In the present invention, as the resin having an ester bond, resins classified as below are preferably used.
(1) Block copolymers, preferably water-soluble block copolymers
(2) Resin particles, preferably random copolymers
(3) Other resins than the above Block Copolymer Having Ester Bond The block copolymer having a unit derived from a (meth)acrylic acid ester has a structure in which a plurality of blocks including blocks composed of one or more (meth)acrylic acid esters are bonded. In other words, diblock copolymers, triblock copolymers, and multiblock copolymers in which a plurality of blocks including a block composed of a single type of (meth)acrylic acid ester are bonded can be used. Block copolymers prepared by replacing any of the blocks constituting the above block copolymer with a block composed of two or more (meth)acrylic acid esters can also be used. A single block in a block copolymer can include one or more units. A block copolymer including blocks each composed of a single unit is specifically preferably used.

The block copolymer can be synthesized by living polymerization method known as living radical polymerization method, living anionic polymerization method, and living cationic polymerization method. Specifically, the block copolymer is preferably synthesized by living radical polymerization method, which is applicable to a wide variety of (meth)acrylic acid esters. As the living radical polymerization method, any known method of NMP method, ATRP method, RAFT method, TERP method, SBRP method, BIRP method, CMRP method, and RTCP method can be used.

In the living radical polymerization method, the degree of polymerization of a first block is calculated from a dry solid content or the residual monomer concentration determined by gas chromatography, and when the consumption of the monomer is ascertained, a monomer to constitute a second block is added to promote the polymerization reaction. By this procedure, a diblock copolymer in which the first block and the second block are bonded can be produced. By repeating the above procedure a plurality of times, a block copolymer in which a plurality of blocks is bonded, such as a triblock copolymer, can be produced.

The block copolymer preferably includes a block having a carboxylic acid group. The carboxylic acid group in a block copolymer not only functions as a functional group that helps the block copolymer to be dissolved in a liquid medium in an ink but also partly functions as a hydrogen-bonding moiety on a recording medium. Hence, the carboxylic acid group interacts with a recording medium and with a pigment through a polysaccharide compound, together with the unit derived from a (meth)acrylic acid ester, and thus the abrasion resistance and the bronzing resistance of an image can be further improved.

The content (% by mass) of the block copolymer in the ink in terms of mass ratio to the content (% by mass) of the pigment is preferably 0.05 time or more to 2.00 times or less. When the mass ratio is less than 0.05 time, the amount of the block copolymer is insufficient relative to the pigment, thus the binder effect is insufficiently exerted, and sufficient abrasion resistance of an image may not be achieved. In addition, a pigment cannot be evenly covered with the resin, and sufficient bronzing resistance of an image may not be achieved. When the mass ratio is more than 2.00 times, a block copolymer having small interaction with the polysaccharide compound eluted from a pigment is likely to be present. As a result, the block copolymer is likely to interact with the pigment in an uneven manner, and sufficient abrasion resistance and sufficient bronzing resistance of an image may not be achieved. The content (% by mass) of the block copolymer in the ink is preferably 0.1% by mass or more to 5.0% by mass or less and more preferably 0.5% by mass or more to 2.5% by mass or less.

The block copolymer preferably has a weight-average molecular weight of 1,000 or more to 30,000 or less and more preferably 5,000 or more to 20,000 or less. The weight-average molecular weight of a block copolymer is a value determined by gel permeation chromatography (GPC) in terms of polystyrene. The block copolymer preferably has an acid value of 100 mg KOH/g or more to 250 mg KOH/g or less and more preferably 120 mg KOH/g or more to 200 mg KOH/g or less. The block copolymer preferably has a volume-average particle diameter of 30 nm or less and more preferably 15 nm or less, where the volume-average particle diameter is determined by dynamic light scattering method. The volume-average particle diameter can be 0 nm. In other words, the block copolymer is not required to be a resin particle capable of forming particles having a certain particle diameter determined by dynamic light scattering method but can be a water-soluble block copolymer.

Resin Particle Having Ester Bond

A resin constituting the resin particle and having a unit derived from a (meth)acrylic acid ester can be prepared by polymerizing one or more (meth)acrylic acid esters. The resin particle can also be prepared by inversion emulsification of a resin having a unit derived from a (meth)acrylic acid ester. The resin particle can be prepared by emulsion polymerization or miniemulsion polymerization using a surfactant or by soap-free polymerization using no surfactant. In the emulsion polymerization and the soap-free polymerization, the type and the amount of a monomer supplied for polymerization reaction can be appropriately changed to prepare a resin particle composed of a plurality of resins.

As the surfactant, an anionic surfactant, a nonionic surfactant, a cationic surfactant and so on can be used. Specifically, an anionic surfactant and a nonionic surfactant are preferred. A reactive surfactant having a vinyl group can also be used. The reactive surfactant is preferred because the surfactant is bonded to a resin particle through polymerization reaction and thus is difficult to release.

The resin particle preferably has a volume-average particle diameter of more than 0 nm, more preferably more than 30 nm, and particularly preferably 50 nm or more to 300 nm or less, where the volume-average particle diameter is determined by dynamic light scattering method. When a resin particle has a volume-average particle diameter of less than 50 nm, the number of resin particles is relatively excess per unit mass. Hence, a resin particle having small interaction with the polysaccharide compound eluted from a pigment is likely to be present, thus the resin particle interacts with the pigment in an uneven manner, and sufficient abrasion resistance and sufficient bronzing resistance of an image may not be achieved. When a resin particle has a volume-average particle diameter of more than 300 nm, the ink ejection stability is insufficiently achieved, and an ink is likely to be unevenly applied to a recording medium. Hence, sufficient abrasion resistance of an image may not be achieved.

The content (% by mass) of the resin particle in the ink in terms of mass ratio to the content (% by mass) of the pigment is preferably 0.10 time or more to 10.00 times or less. When the mass ratio is less than 0.10 time, the amount of the resin particle is insufficient relative to the pigment, thus the binder effect is insufficiently exerted, and sufficient abrasion resistance of an image may not be achieved. In addition, a pigment cannot be evenly covered with the resin particle, and sufficient bronzing resistance of an image may not be achieved. When the mass ratio is more than 10.00 times, a resin particle having small interaction with the polysaccharide compound eluted from a pigment is likely to be present. As a result, the resin particle is likely to interact with the pigment in an uneven manner, and sufficient abrasion resistance and sufficient bronzing resistance of an image may not be achieved. The content (% by mass) of the resin particle in the ink is preferably 0.1% by mass or more to 15.0% by mass or less and more preferably 0.5% by mass or more to 10.0% by mass or less.

The tetrahydrofuran soluble component of the resin particle preferably has a weight-average molecular weight of 10,000 or more to 2,000,000 or less and more preferably 50,000 or more to 500,000 or less. The weight-average molecular weight is a value determined by gel permeation chromatography (GPC) in terms of polystyrene. The tetrahydrofuran soluble component of a resin particle can be obtained as follows: a resin is added to tetrahydrofuran so as to give a content of 1.0% by mass followed by stirring at a temperature of 25° C. for 1 hour, then the mixture is filtered, and the component contained in the filtrate is "tetrahydrofuran soluble component". A filter having a pore size of about 0.45 μm can be used. Some portion of the resin particle is not required to be dissolved in tetrahydrofuran. The component dissolved in tetrahydrofuran is the non-crosslinked portion of a resin particle.

The resin particle preferably has a glass transition temperature of more than 0° C. to 200° C. or less and more preferably 10° C. or more to 150° C. or less. To determine the glass transition temperature, the resin extracted from an ink is dried into a solid form at a temperature of 60° C., then 2 mg of the solid is placed in an aluminum container, and the container is sealed to give a sample for measurement. The measurement sample is subjected to thermal analysis by using a differential scanning calorimeter (DSC) in accordance with the following temperature program. First, the sample is heated to 200° C. at 10° C./min, and is cooled from 200° C. to −50° C. at 5° C./min. Next, while the sample is heated from −50° C. to 200° C. at 10° C./min, thermal analysis is performed to determine the glass transition temperature. The measurement can be performed by using an apparatus such as a differential scanning calorimeter (trade name "DSC Q1000", manufactured by TA instruments). Needless to say, the measurement device, the temperature program, and the like are not limited to the above.

The resin particle preferably has an acid value of 0 mg KOH/g or more to 150 mg KOH/g or less, more preferably 10 mg KOH/g or more to 100 mg KOH/g or less, and particularly preferably 10 mg KOH/g or more to 50 mg KOH/g or less. The resin particle can be either a random copolymer or a block copolymer, and is preferably a random copolymer.

Other Resins Having Ester Bond

As other resins having an ester bond than the above block copolymer and the resin particle, a random copolymer and a graft copolymer can be used. The random copolymer can be synthesized by polymerizing one or more monomers including a (meth)acrylic acid ester in the presence of a polymerization initiator. The polymerization initiator is exemplified by persulfates such as sodium persulfate; organic peroxides such as dicumyl peroxide; azo compounds such as 2,2'-azobis(2-methylbutyronitrile); and inorganic peroxides. In order to control the molecular weight distribution and to introduce a terminal functional group, a chain transfer agent can be used together with the polymerization initiator. The chain transfer agent is exemplified by monofunctional thiols such as 2-mercaptoethanol, 1-thioglycerol, 3-mercaptopropionic acid, 6-mercaptohexanol, 4-acetamidobenzenethiol, 2-(2-mercaptoethoxy)ethanol, and dodecyl mercaptan. By using a polyfunctional thiol such as 1,3-dimercaptopropanol, trimethylolpropane trithioglycolate, pentaerythritol tetrakis-thiopropionate, and dipentaerythritol hexakis-thiopropionate as the chain transfer agent, a stellate resin can also be produced.

The method of synthesizing a graft copolymer is exemplified by the following methods. Of them, (iii) macromonomer method is preferred from the viewpoint of simple synthesis.

(i) Grafting-from method in which a monomer constituting side chains is polymerized from a polymerization starting point introduced to a polymer constituting a main chain (ii) Polymer reaction method in which a polymer constituting a main chain is coupled with a polymer constituting side chains (iii) Macromonomer method in which a monomer constituting a main chain is copolymerized with a macromonomer constituting side chains Resin Having Urethane Bond The urethane bond is the bond represented by —NH—C(=O)O—. The resin including a unit having a urethane bond is referred to as "resin having a urethane bond". The resin having a urethane bond (urethane resin) is generally a resin synthesized by using a polyisocyanate. The urethane resin is preferably a resin synthesized by using a polyisocyanate and a polyol. A urethane resin synthesized by using, as needed, a crosslinking agent and a chain extender such as a polyol and a polyamine is also preferred. The urethane resin synthesized by using such components includes two main segments (a hard segment and a soft segment). The hard segment is composed of units derived from a polyisocyanate, a short chain polyol (a polyol having an acid group and the like), a polyamine, a crosslinking agent, a chain extender, and the like, and mainly imparts strength to the urethane resin. The soft segment is composed of units derived from a long chain polyol and the like, and mainly imparts flexibility to the urethane resin.

As the polyisocyanate, a compound having two or more isocyanate groups can be used. Specific examples of the polyisocyanate include aliphatic polyisocyanates, alicyclic polyisocyanates, aromatic polyisocyanates, and aromatic-aliphatic polyisocyanates. Specifically preferred are aliphatic polyisocyanates such as hexamethylene diisocyanate; and alicyclic polyisocyanates such as 4,4'-dicyclohexylmethane diisocyanate and isophorone diisocyanate. As the polyol, a compound having two or more hydroxy groups can be used. Specific examples of the polyol include polyols having no acid group such as polyester polyols, polycarbonate polyols, and polyether polyols; polyols having an acid group; polyhydroxy polyacetals; polyhydroxy polyacrylates; polyhydroxy polyester amides; and polyhydroxy polythioethers. The urethane resin is preferably a urethane resin including, for example, a unit derived from a polyether polyol or a unit derived a polyol having an acid group. The unit derived from a polyether polyol preferably has a number-average molecular weight of about 400 to 4,000. The acid group of a polyol having an acid group is preferably a carboxylic acid group. Specific examples of the polyol having a carboxylic acid group include dimethylolacetic acid, dimethylolpropionic acid, and dimethylolbutanoic acid. As the chain extender, a compound having two or more hydroxy groups or amino groups per molecule can be used.

The urethane resin preferably has a volume-average particle diameter of 15 nm or less that is determined by dynamic light scattering method. When a urethane resin has a volume-average particle diameter of more than 15 nm, the ink ejection stability may be insufficiently achieved. Thus, an ink is likely to be unevenly applied to a recording medium, and sufficient abrasion resistance of an image may not be achieved. The volume-average particle diameter of the urethane resin in the ink can be 0 nm. In other words, the urethane resin is not required to be a resin particle capable of forming particles having a certain particle diameter determined by dynamic light scattering method, but can be a water-soluble resin.

The content (% by mass) of the urethane resin in the ink in terms of mass ratio to the content (% by mass) of the pigment is preferably 0.05 time or more to 2.00 times or less. When the mass ratio is less than 0.05 time, the amount of the urethane resin is insufficient relative to the pigment, thus the binder effect is insufficiently exerted, and sufficient abrasion resistance of an image may not be achieved. In addition, a pigment cannot be evenly covered with the urethane resin, and sufficient bronzing resistance of an image may not be achieved. When the mass ratio is more than 2.00 times, a urethane resin having small interaction with the polysaccharide compound eluted from a pigment is likely to be present. As a result, the urethane resin is likely to interact with the pigment in an uneven manner, and sufficient abrasion resistance and sufficient bronzing resistance of an image may not be achieved. The content (% by mass) of the urethane resin in the ink is preferably 0.1% by mass or more to 5.0% by mass or less and more preferably 0.5% by mass or more to 2.5% by mass or less.

The urethane resin preferably has a weight-average molecular weight of 3,000 or more to 50,000 or less and more preferably 10,000 or more to 40,000 or less. The weight-average molecular weight of a urethane resin is a value determined by gel permeation chromatography (GPC) in terms of polystyrene. The urethane resin preferably has an acid value of 30 mg KOH/g or more to 250 mg KOH/g or less and more preferably 50 mg KOH/g or more to 150 mg KOH/g or less.

Resin Having Amide Bond

The amide bond is the bond represented by —C(=O)—NH—. The resin including a unit having an amide bond (preferably an acrylic resin) is referred to as "resin having an amide bond". As the resin having an amide bond, a polymer of an amide monomer having a vinyl group can be preferably used because the arrangement of an amide bond in the resin is easily controlled. Specific examples of the amide monomer having a vinyl group include (meth)acrylamide, N-vinylacetamide, and dimethylaminoethyl (meth)acrylate. The resin having an amide bond may be a copolymer of a plurality of amide monomers or a copolymer of an amide monomer and a monomer other than the amide monomer. As the monomer other than the amide monomer, a known monomer can be used. As the monomer other than the amide monomer, an acid monomer is preferably used from the viewpoint of imparting water-solubility or water-dispersibility to a resin. In the present invention, the content of a resin having an amide bond and an ester bond is included in that of "resin having an amide bond", for convenience.

Resin Having Ether Bond

The ether bond is the bond represented by —O—. The resin including a unit having an ether bond (preferably an acrylic resin) is referred to as "resin having an ether bond". As the resin having an ether bond, a polymer of an ether monomer having a vinyl group or a resin including a unit having a polyether chain can be preferably used. A polymer of an ether monomer having a vinyl group is preferably used because the arrangement of an ether bond in the resin is easily controlled. Specific examples of the ether monomer having a vinyl group include ethyl vinyl ether, hydroxyethyl vinyl ether, methoxyethyl (meth)acrylate, polyethylene glycol (meth)acrylate, and phenoxyethyl (meth)acrylate. The resin having an ether bond may be a copolymer of a plurality of ether monomers or a copolymer of an ether monomer and a monomer other than the ether monomer. As the monomer other than the ether monomer, a known monomer can be used. As the monomer other than the ether monomer, an acid monomer is preferably used from the viewpoint of imparting water-solubility or water-dispersibility to a resin. In the present invention, the content of the resin having an ether bond and an ester bond is included in that of "resin having an ether bond", for convenience.

Neutralizer

The resin contained in the ink of the present invention can be either a water-soluble resin or a water-dispersible resin. When the resin has an acid group, the acid group is preferably neutralized by a base. The base is exemplified by ammonium; organic ammoniums; and alkali metal ions. The neutralizer used for neutralizing the acid group by such a base is exemplified by ammonia; organic bases such as N,N-dimethylethanolamine, N,N-diethylethanolamine, diethanolamine, triethanolamine, trimethylamine, and triethylamine; and inorganic bases such as potassium hydroxide, sodium hydroxide, and lithium hydroxide.

Analysis Method of Resin

The formulation and physical properties including molecular weight of a resin can be analyzed by known methods. The formulation and physical properties including molecular weight of a resin can also be determined by analyzing each of the sediment and the supernatant liquid prepared by centrifugation of an ink containing the resin. Although analysis can be performed in the state of ink, the use of an extracted resin can further improve analysis precision. Specifically, an ink is first centrifuged at 200,000 G for 30 minutes to give a liquid phase, and a resin is extracted from the liquid phase. Next, the extracted resin can be analyzed by using a pyrolysis gas chromatography/mass spectrometry (Py-GC/MS) to determine the unit type constituting the resin. Separately, the extracted resin can be quantitatively analyzed by nuclear magnetic resonance method (NMR) or a Fourier transformation infrared spectrometer (FT-IR) to determine the monomer type constituting the resin, the molecular weight, the content, and the like. When the resin is a block copolymer or a graft copolymer, MALDI-TOF-MS can be used to determine the continuity of a unit constituting the resin. The acid value of a resin can be determined by titrimetry. The neutralizer type of an acid group of a resin can be identified by electrophoresis chromatography. The weight-average molecular weight (Mw) and the number-average molecular weight (Mn) of a resin can be determined by gel permeation chromatography (GPC). The volume-average particle diameter of a resin can be determined by dynamic light scattering method.

When an ink contains a resin dispersant and an additional resin, the resin dispersant and the additional resin can be separated by the following procedure. As a prerequisite, the resin dispersant and the additional resin are distinguished by the adsorption amount to a pigment. In other words, a resin adsorbed to a pigment in a larger amount is the resin dispersant, and the other resins are additional resins.

When a plurality of resins is present in a system, the resins can undergo adsorption exchange theoretically. However, in the case of an aqueous ink for ink jet, the adsorption exchange does not proceed to such an extent as to cause a resin dispersant and an additional resin to change places. This is because the additional resin is used to expect the function for image properties, reliability, or the like. If an additional resin expected to exert such a function causes adsorption exchange with the resin dispersant when used in combination, the use of the additional resin would be meaningless in the first place.

An ink containing a pigment, a resin dispersant, and an additional resin is centrifuged at 200,000 G for 30 minutes to separate a sediment (containing the pigment and the resin adsorbed to the pigment). The sediment is washed with an acid and is sufficiently dried. The dried sediment is added to an organic solvent such as tetrahydrofuran, and the resultant is stirred to elute the resin adsorbed to the pigment into the organic solvent. Then, the liquid is centrifuged at 5,000 G for 5 minutes to separate the pigment being the sediment from the resin dissolved in the organic solvent. The liquid component is dried into a solid to give the resin that has been adsorbed to the pigment, or the resin dispersant. Meanwhile, the resin not having adsorbed to the pigment is contained in the liquid phase after the centrifugation at 200,000 G for 30 minutes. To the liquid phase, an acid or the like is added to cause the resin to aggregate. The resin aggregate is collected, then thoroughly washed with water, and dried, giving the resin that has not been absorbed to the pigment, or the additional resin. The resin dispersant and the additional resin prepared as above can be subjected to the above-described analysis techniques to reveal various properties.

In the above procedure, "resin that has been adsorbed to the pigment" may contain a small amount of "resin that has not been adsorbed to the pigment", and "resin that has not been adsorbed to the pigment" may contain a small amount of "resin that has been adsorbed to the pigment". In such a case, the resin having the largest mass proportion of "resins that have been adsorbed to the pigment" can be considered to be the resin dispersant, for example.

Aqueous Medium

The ink of the present invention is an aqueous ink containing at least water as the aqueous medium. The ink can contain an aqueous medium that is a mixed solvent of water and a water-soluble organic solvent. As the water, deionized water or ion-exchanged water is preferably used. The content (% by mass) of water in the aqueous ink is preferably 50.0% by mass or more to 95.0% by mass or less based on the total mass of the ink.

The water-soluble organic solvent may be any water-soluble solvent, and can be an alcohol, a polyhydric alcohol, a polyglycol, a glycol ether, a nitrogen-containing polar solvent, a sulfur-containing polar solvent, and the like. The content (% by mass) of the water-soluble organic solvent in the ink is preferably 3.0% by mass or more to 50.0% by mass or less based on the total mass of the ink.

Other Additives

The ink of the present invention can contain various additives such as a surfactant, a pH adjuster, an anticorrosive, an antiseptic agent, an antifungal agent, an antioxidant, a reduction inhibitor, an evaporation accelerator, and a chelating agent, as needed.

Examples of the surfactant include anionic, cationic, and nonionic surfactants. The content (% by mass) of the surfactant in the ink is preferably 0.1% by mass or more to 5.0% by mass or less and more preferably 0.1% by mass or more to 2.0% by mass or less based on the total mass of the ink.

Physical Properties of Ink

The ink of the present invention is an ink for ink jet applied to an ink jet system. Hence, the physical property values thereof are preferably controlled to appropriate values. Specifically, the ink preferably has a surface tension of 10 mN/m or more to 60 mN/m or less and more preferably 20 mN/m or more to 60 mN/m or less at 25° C. More specifically, the surface tension is preferably 30 mN/m or more to 50 mN/m or less and particularly preferably 30 mN/m or more to 40 mN/m or less. The ink preferably has a viscosity of 1.0 mPa·s or more to 10.0 mPa·s or less, more preferably 1.0 mPa·s or more to 5.0 mPa·s or less, and particularly preferably 1.0 mPa·s or more to 3.0 mPa·s or less at 25° C. The ink preferably has a pH of 5.0 or more to 10.0 or less at 25° C. Specifically, the pH is preferably 6.0 or more to 8.5 or less.

Method for Producing Ink

The ink of the present invention can be produced by a method for producing a common aqueous ink for ink jet except that the pigment impregnated with a polysaccharide compound is used. Specifically, the ink can be produced by performing step (1) of preparing a pigment impregnated with a polysaccharide compound and step (2) of mixing ink components including the pigment. The step (1) can be performed in accordance with the above method of impregnating a pigment with a polysaccharide compound. The subsequent steps can be performed in the same manner as a method for producing a common aqueous ink for ink jet, and additional steps such as purification can be performed, as needed.

Ink Cartridge

The ink cartridge of the present invention includes an ink and an ink storage portion that stores the ink. The ink stored in the ink storage portion is the above-described ink of the present invention. FIG. 1 is a schematic sectional view illustrating an embodiment of the ink cartridge of the present invention. As shown in FIG. 1, the bottom face of the ink cartridge has an ink supply port 12 for supplying the ink to a recording head. The inside of the ink cartridge is an ink storage portion for storing the ink. The ink storage portion includes an ink storage chamber 14 and an absorber storage chamber 16, and the ink storage chamber 14 and the absorber storage chamber 16 communicate with each other through a communication hole 18. The absorber storage chamber 16 communicates with the ink supply port 12. The ink storage chamber 14 stores a liquid ink 20, and the absorber storage chamber 16 stores absorbers 22 and 24 that are impregnated with the ink to hold the ink. The ink storage portion does not necessarily have the ink storage chamber that stores a liquid ink, and can be a portion in which all the ink stored is held by absorbers. The ink storage portion does not necessarily have absorbers, and can be a portion that stores all the ink in a liquid state. The ink storage portion may be integrated with a recording head to form an ink cartridge.

Ink Jet Recording Method

The ink jet recording method of the present invention is a method in which the above-described ink of the present invention is ejected from an ink jet recording head to record an image on a recording medium. The system for ejecting the ink is exemplified by a system of applying mechanical energy to an ink and a system of applying thermal energy to an ink. In the present invention, a system of applying thermal energy to an ink to eject the ink is particularly preferably used. The ink jet recording method can include known steps except that the ink of the present invention is used.

Figure 2A:
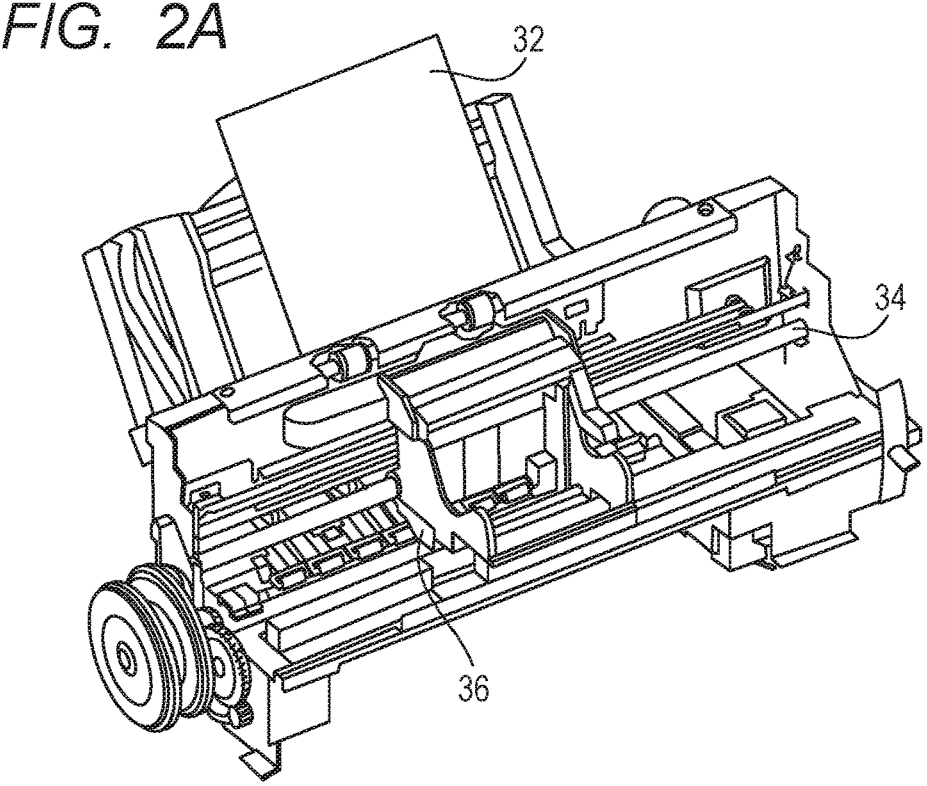
FIGS. 2A and 2B are schematic views illustrating an exemplary ink jet recording apparatus used for an ink jet recording method of the present invention.
Figure 2B:
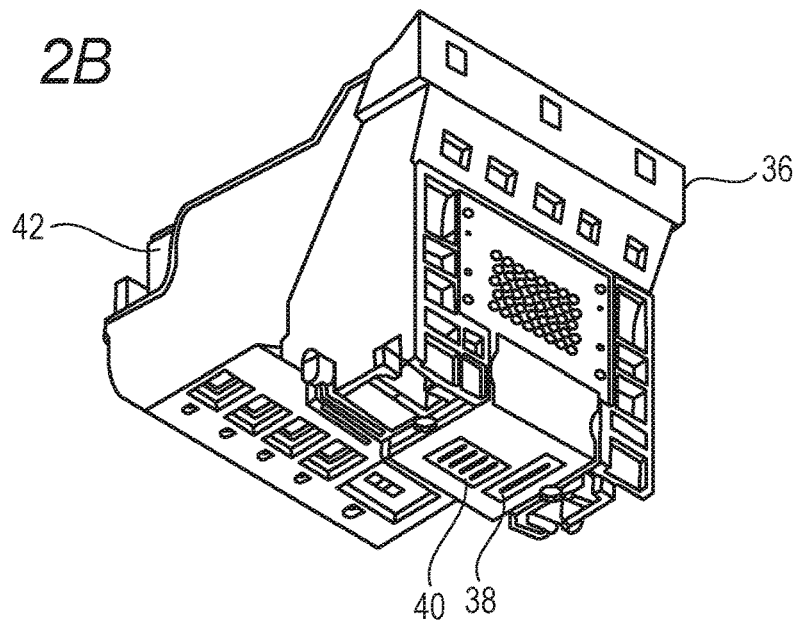

FIGS. 2A and 2B are schematic views illustrating an exemplary ink jet recording apparatus used for the ink jet recording method of the present invention; FIG. 2A is a perspective view of a principal part of the ink jet recording apparatus; and FIG. 2B is a perspective view of a head cartridge. The ink jet recording apparatus includes a conveyance unit (not illustrated) for conveying a recording medium 32 and a carriage shaft 34. On the carriage shaft 34, a head cartridge 36 can be installed. The head cartridge 36 includes recording heads 38 and 40 and is so constructed that an ink cartridge 42 can be set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

The recording medium to be an object for recording by using the ink of the present invention may be any recording medium, and can be selected depending on an intended use purpose of a recorded product on which an image is recorded. The recording medium is exemplified by papers having permeability, such as plain papers and recording media having a coating layer. For example, plain papers suitable for giving images such as business texts can be used. The recording medium can also be glossy papers that are suitable for giving images having glossiness of photographic image quality and art papers that take advantage of substrate textures (for example, a mat texture, a drawing paper texture, a canvas texture, and a Japanese paper texture) in order to express preferred images such as pictures, photographs, and graphic images. In particular, recording media including plain papers having no coating layer and recording media including coated papers having a coating layer are preferably used.

EXAMPLES

The present invention will next be described in further detail with reference to examples and comparative examples, but the invention is not intended to be limited to the following examples without departing from the scope of the invention. The component amounts with "part(s)" or "%" are based on mass unless otherwise noted.

Production of Pigment

Components shown in Table 3 were mixed, and the mixture was fed in a twin-screw kneading extruder (trade name "TEM-26SX", manufactured by Toshiba Machine) and kneaded. The pigment was pulverized and then was washed to remove dimethyl sulfoxide, giving each of the pigments 1 to 26. The quinacridone solid solution contains a solid solution pigment of C.I. Pigment Red 122 and C.I. Pigment Violet 19.

An endotoxin measurement system (trade name "Toxinometer ET6000, SLP Reagent Set", manufactured by Wako Pure Chemical Industries) was used to analyze the pigments 1 to 25. The result revealed that each pigment was impregnated with a polysaccharide compound. The polysaccharide compound with which the pigment is impregnated was analyzed by using an HPLC equipped with a column for sugar analysis (trade name "Shim-pack SCR-101P, manufactured by Shimadzu Corporation). The result revealed that with the same polysaccharide compound as that used for the production of the pigment the resultant pigment was impregnated. The result also revealed that the pigment 26 was impregnated with no polysaccharide compound.

TABLE 3

Preparation conditions of pigment

| | | Crude pigment (parts) | | Dimethyl sulfoxide (parts) | Polysaccharide compound (ppm based on pigment) | |
|---|---|---|---|---|---|---|
| Pigment | 1 | C.I. Pigment Blue 15:3 | 95.5 | 4.0 | Lipopolysaccharide | 5,000 |
| | 2 | C.I. Pigment Yellow 74 | 95.5 | 4.0 | Lipopolysaccharide | 5,000 |
| | 3 | C.I. Pigment Yellow 155 | 95.5 | 4.0 | Lipopolysaccharide | 5,000 |
| | 4 | Quinacridone solid solution | 95.5 | 4.0 | Lipopolysaccharide | 5,000 |
| | 5 | C.I. Pigment Red 122 | 95.5 | 4.0 | Lipopolysaccharide | 5,000 |
| | 6 | C.I. Pigment Red 149 | 95.5 | 4.0 | Lipopolysaccharide | 5,000 |
| | 7 | C.I. Pigment Red 150 | 95.5 | 4.0 | Lipopolysaccharide | 5,000 |
| | 8 | C.I. Pigment Red 254 | 95.5 | 4.0 | Lipopolysaccharide | 5,000 |
| | 9 | C.I. Pigment Violet 19 | 95.5 | 4.0 | Lipopolysaccharide | 5,000 |
| | 10 | C.I. Pigment Violet 23 | 95.5 | 4.0 | Lipopolysaccharide | 5,000 |
| | 11 | C.I. Pigment Orange 43 | 95.5 | 4.0 | Lipopolysaccharide | 5,000 |
| | 12 | C.I. Pigment Orange 64 | 95.5 | 4.0 | Lipopolysaccharide | 5,000 |
| | 13 | C.I. Pigment Green 7 | 95.5 | 4.0 | Lipopolysaccharide | 5,000 |
| | 14 | C.I. Pigment Green 36 | 95.5 | 4.0 | Lipopolysaccharide | 5,000 |
| | 15 | Carbon black | 95.5 | 4.0 | Lipopolysaccharide | 5,000 |
| | 16 | C.I. Pigment Blue 15:3 | 95.5 | 4.0 | Xanthan gum | 5,000 |
| | 17 | C.I. Pigment Blue 15:3 | 95.5 | 4.0 | Hyaluronic acid | 5,000 |
| | 18 | C.I. Pigment Blue 15:3 | 95.5 | 4.0 | Gellan gum | 5,000 |
| | 19 | C.I. Pigment Blue 15:3 | 95.5 | 4.0 | Ganglioside (GQ1b) | 5,000 |
| | 20 | C.I. Pigment Blue 15:3 | 95.5 | 4.0 | Peptidoglycan | 5,000 |
| | 21 | C.I. Pigment Blue 15:3 | 95.5 | 4.0 | Lipoteichoic acid | 5,000 |
| | 22 | C.I. Pigment Blue 15:3 | 95.5 | 4.0 | Guar gum | 5,000 |
| | 23 | C.I. Pigment Blue 15:3 | 95.5 | 4.0 | Dextran | 5,000 |
| | 24 | C.I. Pigment Blue 15:3 | 96.0 | 4.0 | Lipopolysaccharide | 2 |
| | 25 | C.I. Pigment Blue 15:3 | 96.0 | 4.0 | Lipopolysaccharide | 1 |
| | 26 | C.I. Pigment Blue 15:3 | 100.0 | | | |

Lipopolysaccharide: An extract of a culture of a Gram-negative bacterium (E. coli) was used.

Peptidoglycan: An extract of a culture of Sphingomonas paucimobilis was used.

Lipoteichoic acid: A compound in which a peptidoglycan extracted from a culture of a Gram-negative bacterium was bonded to teichoic acid was used.

Preparation of Pigment Dispersion Liquid

Pigment Dispersion Liquids I-1 to I-15 and I-17 to I-28

The components shown below were mixed, and the mixture was subjected to dispersion treatment by using a high-pressure homogenizer (trade name "Starburst", manufactured by Sugino Machine) at a treatment pressure of 245 MPa. The resin (dispersant) synthesized by the method described later was used. An appropriate amount of ion-exchanged water was then added to give each pigment dispersion liquid.

A pigment shown in Table 4: 20.0 parts
A resin liquid shown in Table 4: 30.0 parts
Ion-exchanged water: 50.0 parts Pigment Dispersion Liquid I-16

A solution prepared by dissolving 60 mmol of concentrated hydrochloric acid in 5.5 g of water was cooled at 5° C., and to the cooled solution, 8.28 mmol of 4-aminophthalic acid was added. The container containing the solution was put in an ice bath. While the solution was stirred to maintain a temperature of 10° C. or less, a solution prepared by dissolving 21.2 mmol of sodium nitrite in 9.0 g of water at 5° C. was added. After stirring for 15 minutes, 6.0 g of the pigment 1 was added under stirring followed by additional stirring for 15 minutes to give a slurry. The obtained slurry was filtered through a filter paper (trade name "Standard filter paper No. 2", manufactured by ADVANTEC), and the particles were thoroughly washed with water, and dried in an oven at 110° C. An appropriate amount of ion-exchanged water was added to adjust the pigment content, and a pigment dispersion liquid I-16 having a pigment content of 15.0% was prepared.

Pigment Dispersion Liquid I-29

The same procedure was performed as in the preparation of the pigment dispersion liquid I-16 except that the pigment 26 was used, giving a pigment dispersion liquid I-29 having a pigment content of 15.0%.

Quantitative Determination of Polysaccharide Compound

The prepared pigment dispersion liquid was diluted 2,500 times (in terms of mass) by adding ion-exchanged water. An endotoxin measurement system (trade name "Toxinometer ET-6000", SLP Reagent Set, manufactured by Wako Pure Chemical Industries) was used to quantitatively determine the content of the polysaccharide compound, and the mass ratio (ppm) to the pigment was calculated. The prepared pigment dispersion liquid was subjected to ultrafiltration through the ultrafiltration membrane shown below by a diafiltration system to remove a polysaccharide compound present in a free state in the pigment dispersion liquid.

Ultrafiltration Membrane
Type: modified polyethersulfone hollow fiber module (trade name "MicroKros", manufactured by Spectrum Laboratories)
Cutoff molecular weight: 100 kDa
Membrane area: 1,600 $cm^2$
Inner diameter: 0.5 mm The pigment dispersion liquid after removal of the polysaccharide compound present in a free state was diluted 2,500 times (in terms of mass) by adding ion-exchanged water. An endotoxin measurement system (trade name "Toxinometer ET-6000", SLP Reagent Set, manufactured by Wako Pure Chemical Industries) was used to quantitatively determine the content of the polysaccharide compound. The quantitative determination result of the polysaccharide compound in the pigment dispersion liquid without ultrafiltration was compared with the quantitative determination result of the polysaccharide compound in the pigment dispersion liquid after ultrafiltration to calculate the amount of the polysaccharide compound with which the pigment is impregnated (impregnated amount) and the amount of the polysaccharide compound present in a free state (free amount). The results are shown in Table 4.

TABLE 4

Preparation conditions and properties of pigment dispersion liquid

| | | | Resin | | Properties | | Pigment dispersion liquid (P + F) | Mass ratio of amount of polysaccharide compound to amount of pigment (ppm) | |
|---|---|---|---|---|---|---|---|---|---|
| | | Pigment type | Type | Amount (parts) | Pigment content (%) | Resin content (%) | | Impregnated amount (P) | Free amount (F) |
| Pigment dispersion liquid (before treatment) | I-1 | 1 | R1 | 30.0 | 15.0 | 4.5 | 4,600 | 4,550 | 50 |
| | I-2 | 2 | R1 | 30.0 | 15.0 | 4.5 | 4,600 | 4,550 | 50 |
| | I-3 | 3 | R1 | 30.0 | 15.0 | 4.5 | 4,600 | 4,550 | 50 |
| | I-4 | 4 | R1 | 30.0 | 15.0 | 4.5 | 4,600 | 4,550 | 50 |
| | I-5 | 5 | R1 | 30.0 | 15.0 | 4.5 | 4,600 | 4,550 | 50 |
| | I-6 | 6 | R1 | 30.0 | 15.0 | 4.5 | 4,600 | 4,550 | 50 |
| | I-7 | 7 | R1 | 30.0 | 15.0 | 4.5 | 4,600 | 4,550 | 50 |
| | I-8 | 8 | R1 | 30.0 | 15.0 | 4.5 | 4,600 | 4,550 | 50 |
| | I-9 | 9 | R1 | 30.0 | 15.0 | 4.5 | 4,600 | 4,550 | 50 |
| | I-10 | 10 | R1 | 30.0 | 15.0 | 4.5 | 4,600 | 4,550 | 50 |
| | I-11 | 11 | R1 | 30.0 | 15.0 | 4.5 | 4,600 | 4,550 | 50 |
| | I-12 | 12 | R1 | 30.0 | 15.0 | 4.5 | 4,600 | 4,550 | 50 |
| | I-13 | 13 | R1 | 30.0 | 15.0 | 4.5 | 4,600 | 4,550 | 50 |
| | I-14 | 14 | R1 | 30.0 | 15.0 | 4.5 | 4,600 | 4,550 | 50 |
| | I-15 | 15 | R1 | 30.0 | 15.0 | 4.5 | 4,600 | 4,550 | 50 |
| | I-16 | 1 | — | — | 15.0 | 0.0 | 4,600 | 4,550 | 50 |
| | I-17 | 16 | R1 | 30.0 | 15.0 | 4.5 | 4,600 | 4,550 | 50 |

TABLE 4-continued

Preparation conditions and properties of pigment dispersion liquid

|  | Pigment type | Resin Type | Resin Amount (parts) | Properties Pigment content (%) | Properties Resin content (%) | Mass ratio of amount of polysaccharide compound to amount of pigment (ppm) Pigment dispersion liquid (P + F) | Mass ratio of amount of polysaccharide compound to amount of pigment (ppm) Impregnated amount (P) | Mass ratio of amount of polysaccharide compound to amount of pigment (ppm) Free amount (F) |
|---|---|---|---|---|---|---|---|---|
| I-18 | 17 | R1 | 30.0 | 15.0 | 4.5 | 4,600 | 4,550 | 50 |
| I-19 | 18 | R1 | 30.0 | 15.0 | 4.5 | 4,600 | 4,550 | 50 |
| I-20 | 19 | R1 | 30.0 | 15.0 | 4.5 | 4,600 | 4,550 | 50 |
| I-21 | 20 | R1 | 30.0 | 15.0 | 4.5 | 4,600 | 4,550 | 50 |
| I-22 | 21 | R1 | 30.0 | 15.0 | 4.5 | 4,600 | 4,550 | 50 |
| I-23 | 22 | R1 | 30.0 | 15.0 | 4.5 | 4,600 | 4,550 | 50 |
| I-24 | 23 | R1 | 30.0 | 15.0 | 4.5 | 4,600 | 4,550 | 50 |
| I-25 | 24 | R1 | 30.0 | 15.0 | 4.5 | 2 | 2 | 0 |
| I-26 | 25 | R1 | 30.0 | 15.0 | 4.5 | 1 | 1 | 0 |
| I-27 | 1 | R2 | 30.0 | 15.0 | 4.5 | 4,600 | 4,550 | 50 |
| I-28 | 1 | R3 | 30.0 | 15.0 | 4.5 | 4,600 | 4,550 | 50 |
| I-29 | 26 | — | — | 15.0 | 0.0 | 0 | 0 | 0 |

Adjustment of Mass Ratio of Amount of Polysaccharide Compound Impregnated in Pigment to Amount of Pigment In accordance with the following procedure, the mass ratio of the amount of the polysaccharide compound with which the pigment is impregnated to the amount of the pigment was adjusted.

(A) Step of releasing polysaccharide compound from pigment

In a glass beaker having a volume of 2 L, 1 kg of a pigment dispersion liquid to be treated was placed, and an appropriate amount of an aqueous potassium hydroxide was added to the pigment dispersion liquid under stirring with a stirrer to adjust the pH to 12.0. The mixture was heated to a temperature shown in Table 5, then stirred for about 10 minutes, and cooled to normal temperature. By this operation, the polysaccharide compound was released from the pigment.

(B) Step of removing components having smaller size than that of pigment, of components derived from polysaccharide compound released from pigment The liquid after the step (A) was subjected to ultrafiltration through the ultrafiltration membrane shown below by a diafiltration system.

Ultrafiltration Membrane
Type: modified polyethersulfone hollow fiber module (trade name "MicroKros", manufactured by Spectrum Laboratories)
Cutoff molecular weight: value shown in Table 5
Membrane area: 1,600 cm²
Inner diameter: 0.5 mm (C) Step of removing alkali component used in step (A)

After continuous repetition of the step (B), the pH of the liquid was adjusted to 9.0.

(D) Step of removing components having larger size than that of pigment, of components derived from polysaccharide compound released from pigment The liquid after the step (C) was centrifuged at 22,000 G for 10 minutes to remove coarse pigment particles and modified and gelated polysaccharide compounds.

(E) Step of removing modified and gelated polysaccharide compounds

The liquid after the step (D) was filtered through a filter paper having a pore size of 0.45 μm (trade name "Ultipor GF-HV", manufactured by Pall) to remove modified and gelated polysaccharide compounds.

(F) Calculation of mass ratio of amount of polysaccharide compound with which pigment is impregnated to amount of pigment The liquid after the step (E) (pigment dispersion liquid) was diluted 2,500 times (in terms of mass) by adding ion-exchanged water. An endotoxin measurement system (trade name "Toxinometer ET-6000", SLP Reagent Set, manufactured by Wako Pure Chemical Industries) was used to quantitatively determine the content of the polysaccharide compound, and the mass ratio to the amount of the pigment (impregnated amount P (ppm)) was calculated.

Separately, the liquid after the step (E) (pigment dispersion liquid) was diluted 2,500 times (in terms of mass) by adding ion-exchanged water. The diluted liquid was subjected to ultrafiltration through the ultrafiltration membrane shown below by a diafiltration system to remove the polysaccharide compound present in a free state in the pigment dispersion liquid.

Ultrafiltration Membrane
Type: modified polyethersulfone hollow fiber module (trade name "MicroKros", manufactured by Spectrum Laboratories)
Cutoff molecular weight: 70 kDa
Membrane area: 1,600 cm²
Inner diameter: 0.5 mm The pigment dispersion liquid after removal of the polysaccharide compound present in a free state was diluted 2,500 times (in terms of mass) by adding ion-exchanged water. An endotoxin measurement system (trade name "Toxinometer ET-6000", SLP Reagent Set, manufactured by Wako Pure Chemical Industries) was used to quantitatively determine the content of the polysaccharide compound. Based on the difference from the impregnated amount P (ppm), the mass ratio of the amount of the polysaccharide compound present in a free state in the pigment dispersion liquid to the amount of the pigment (free amount F (ppm)) was calculated. From the above results, the value (P/(P+F))×100 was further calculated.

TABLE 5

Preparation conditions and properties of pigment dispersion liquid

| | Pigment dispersion liquid (before treatment) | | Preparation conditions | | Mass ratio of amount of polysaccharide compound to amount of pigment (ppm) | | Value of (P/(P + F)) × 100 | Properties | |
|---|---|---|---|---|---|---|---|---|---|
| | | | Temperature (° C.) | Cutoff molecular weight (kDa) | Impregnated amount P | Free amount F | | Pigment content (%) | Resin content (%) |
| Pigment dispersion liquid (after treatment) | II-1 | I-1 | 80 | 70 | 3,000 | 0 | 100 | 15.0 | 2.7 |
| | II-2 | I-2 | 80 | 70 | 3,000 | 0 | 100 | 15.0 | 2.7 |
| | II-3 | I-3 | 80 | 70 | 3,000 | 0 | 100 | 15.0 | 2.7 |
| | II-4 | I-4 | 80 | 70 | 3,000 | 0 | 100 | 15.0 | 2.7 |
| | II-5 | I-5 | 80 | 70 | 3,000 | 0 | 100 | 15.0 | 2.7 |
| | II-6 | I-6 | 80 | 70 | 3,000 | 0 | 100 | 15.0 | 2.7 |
| | II-7 | I-7 | 80 | 70 | 3,000 | 0 | 100 | 15.0 | 2.7 |
| | II-8 | I-8 | 80 | 70 | 3,000 | 0 | 100 | 15.0 | 2.7 |
| | II-9 | I-9 | 80 | 70 | 3,000 | 0 | 100 | 15.0 | 2.7 |
| | II-10 | I-10 | 80 | 70 | 3,000 | 0 | 100 | 15.0 | 2.7 |
| | II-11 | I-11 | 80 | 70 | 3,000 | 0 | 100 | 15.0 | 2.7 |
| | II-12 | I-12 | 80 | 70 | 3,000 | 0 | 100 | 15.0 | 2.7 |
| | II-13 | I-13 | 80 | 70 | 3,000 | 0 | 100 | 15.0 | 2.7 |
| | II-14 | I-14 | 80 | 70 | 3,000 | 0 | 100 | 15.0 | 2.7 |
| | II-15 | I-15 | 80 | 70 | 3,000 | 0 | 100 | 15.0 | 2.7 |
| | II-16 | I-16 | 80 | 70 | 3,000 | 0 | 100 | 15.0 | 0.0 |
| | II-17 | I-17 | 80 | 70 | 3,000 | 0 | 100 | 15.0 | 2.7 |
| | II-18 | I-18 | 80 | 70 | 3,000 | 0 | 100 | 15.0 | 2.7 |
| | II-19 | I-19 | 80 | 70 | 3,000 | 0 | 100 | 15.0 | 2.7 |
| | II-20 | I-20 | 80 | 70 | 3,000 | 0 | 100 | 15.0 | 2.7 |
| | II-21 | I-21 | 80 | 70 | 3,000 | 0 | 100 | 15.0 | 2.7 |
| | II-22 | I-22 | 80 | 70 | 3,000 | 0 | 100 | 15.0 | 2.7 |
| | II-23 | I-23 | 80 | 70 | 3,000 | 0 | 100 | 15.0 | 2.7 |
| | II-24 | I-24 | 80 | 70 | 3,000 | 0 | 100 | 15.0 | 2.7 |
| | II-25 | I-25 | 60 | 70 | 0.9 | 0 | 100 | 15.0 | 2.7 |
| | II-26 | I-26 | — | — | 1.0 | 0 | 100 | 15.0 | 4.5 |
| | II-27 | I-1 | 60 | 70 | 4,500 | 0 | 100 | 15.0 | 2.7 |
| | II-28 | I-1 | — | 3 | 4,550 | 6 | 100 | 15.0 | 4.5 |
| | II-29 | I-1 | 80 | 30 | 3,000 | 590 | 84 | 15.0 | 4.5 |
| | II-30 | I-1 | 80 | 50 | 3,000 | 330 | 90 | 15.0 | 3.9 |
| | II-31 | I-27 | 80 | 70 | 3,000 | 0 | 100 | 15.0 | 2.7 |
| | II-32 | I-28 | 80 | 70 | 3,000 | 0 | 100 | 15.0 | 2.7 |
| | II-33 | I-29 | — | — | 0 | 0 | — | 15.0 | 0.0 |

Synthesis of Resins

Resins R1 to R10

In accordance with the following procedure, water-soluble resins R1 to R10 being random copolymers having various bonds were synthesized. In a flask equipped with a stirrer, a nitrogen inlet tube, a reflux condenser, and a thermometer, 200.0 parts of isopropanol was placed, and then the solvent was heated to 85° C. under a nitrogen atmosphere with stirring. A monomer mixture, a polymerization initiator, and a chain transfer agent shown in Table 6 were each added dropwise into the flask over 2 hours while maintained at 80° C. While the inner temperature was maintained at 80° C., the mixture was stirred for 4 hours to synthesize a resin. To the resin, 0.9 equivalent of potassium hydroxide relative to the acid value of the resin and an appropriate amount of ion-exchanged water were added, then isopropanol was removed under reduced pressure, and a liquid having a resin content (solid content) of 20.0% was prepared. The abbreviations in Table 6 mean the following substances.

St: styrene nBA: n-butyl acrylate

PME200: methoxypolyethylene glycol methacrylate (manufactured by NOF)

NVA: N-vinylacetamide

2-EHV: 2-ethylhexyl vinyl ether

AA: acrylic acid

Polymerization initiator 1: a solution prepared by dissolving 5.0 parts of trade name "PERKADOX L-W75 (LS)" (manufactured by Kayaku Akzo, dibenzoyl peroxide, purity: 75%) in 10.0 parts of isopropanol Polymerization initiator 2: trade name "V-59" (manufactured by Wako Pure Chemical Industries, 2,2'-azobis(2-methylbutyronitrile))

Chain transfer agent 1: a solution prepared by dissolving 1.9 parts of 1-thioglycerol in 10.0 parts of isopropanol Chain transfer agent 2: 10.0 parts of dipentaerythritol hexakis-thiopropionate

TABLE 6

Synthetic conditions and properties of resins R11 to R10

| Resin | Monomer (parts) | | | | | | Polymerization initiator (parts) | | Chain transfer agent | | Weight-average molecular weight | Acid value (mgKOH/g) | Bond |
| | St | nBA | PME 200 | NVA | 2-EHV | AA | 1 | 2 | 1 | 2 | | | |
|---|---|---|---|---|---|---|---|---|---|---|---|---|---|
| R1 | 80.0 | | | | | 20.0 | 5.0 | | | | 9,000 | 140 | — |
| R2 | 60.0 | 20.0 | | | | 20.0 | 5.0 | | | | 9,000 | 140 | Ester bond |
| R3 | 60.0 | | 20.0 | | | 20.0 | 5.0 | | | | 9,000 | 140 | Ester bond |
| R4 | 60.0 | | | 20.0 | | 20.0 | 5.0 | | | | 9,000 | 140 | Amide bond |
| R5 | | | | 80.0 | | 20.0 | 5.0 | | | | 9,000 | 140 | Amide bond |
| R6 | 60.0 | | | | 20.0 | 20.0 | 5.0 | | | | 9,000 | 140 | Ether bond |
| R7 | | | | | 80.0 | 20.0 | 5.0 | | | | 9,000 | 140 | Ether bond |
| R8 | 60.0 | 20.0 | | | | 20.0 | | 2.0 | | | 9,000 | 140 | Ester bond |
| R9 | 60.0 | 20.0 | | | | 20.0 | | 0.2 | ○ | | 9,000 | 140 | Ester bond |
| R10 | 60.0 | 20.0 | | | | 20.0 | 5.0 | | | ○ | 9,000 | 140 | Ester bond |

Resins G1 to G5

In accordance with the following procedure, water-soluble resins G1 to G5 being graft copolymers having an ester bond were synthesized. In a flask equipped with a stirrer, a nitrogen inlet tube, a reflux condenser, and a thermometer, 100.0 parts of methyl ethyl ketone was placed, and then the solvent was heated to 80° C. under a nitrogen atmosphere with stirring. A mixed liquid of monomers for a macromonomer in amounts shown in Table 7 and 3.0 parts of 3-mercaptopropionic acid, and a solution of 0.3 part of a polymerization initiator in 10.0 parts of methyl ethyl ketone were prepared. The polymerization initiator used was 2,2'-azobis(2-methylbutyronitrile) (trade name "V-59", manufactured by Wako Pure Chemical Industries). The prepared mixed liquid and the solution were each added dropwise into the flask over 2 hours while maintained at 80° C. While the inner temperature was maintained at 80° C., the mixture was stirred for 4 hours to give a reaction product.

The obtained reaction product was poured into methanol to precipitate a resin followed by filtration, and the resin was washed with water to give a prepolymer having a terminal carboxylic acid group. In 60.0 parts of N,N-dimethylacetamide, 20.0 parts of the obtained prepolymer was dissolved, and 6.2 parts of glycidyl methacrylate, 0.5 part of N,N-dimethyldodecylamine, and 0.1 part of hydroquinone (polymerization inhibitor) were added. The mixture was heated to 130° C. and stirred for 6 hours, giving a reaction product. The obtained reaction product was poured into methanol to precipitate a resin, and then the resin was washed with water and dried, giving a macromonomer having a terminal methacryloyl group and a weight-average molecular weight of 2,000.

In a flask equipped with a stirrer, a nitrogen inlet tube, a reflux condenser, and a thermometer, 200.0 parts of methyl ethyl ketone was placed, and then the solvent was heated to 80° C. under a nitrogen atmosphere with stirring. A mixed liquid of 50.0 parts (solid content) of the obtained macromonomer and monomers in amounts shown in Table 7, and a solution of 2.0 parts of a polymerization initiator in 10.0 parts of methyl ethyl ketone were prepared. The polymerization initiator used was 2,2'-azobis(2-methylbutyronitrile) (trade name "V-59", manufactured by Wako Pure Chemical Industries). The prepared mixed liquid and the solution were each added dropwise into the flask over 2 hours while maintained at 80° C. The mixture was stirred for 4 hours while the inner temperature was maintained at 80° C., then 200.0 parts of 2 mol/L solution of potassium hydroxide in ethanol was added, and methyl ethyl ketone was removed under reduced pressure.

To the resultant, 1.0 part of trifluoroacetic acid was added followed by stirring for 2 hours to hydrolyze the t-butyl group. To the resulting liquid, 200.0 parts of 3 mol/L hydrochloric acid was added, and the precipitated resin was separated, washed with water, and dried, giving resins G1 to G5. To the resin, 0.9 equivalent of potassium hydroxide relative to the acid value of the obtained resin and an appropriate amount of ion-exchanged water were added to give a liquid having a resin content (solid content) of 20.0%. The abbreviations in Table 7 mean the following substances.

St: styrene
nBA: n-butyl acrylate
tBA: t-butyl acrylate

TABLE 7

Synthetic conditions and properties of resins G1 to G5

| Resin | Macromonomer Monomer (parts) | | | Monomer (parts) | | | Properties | |
| | St | nBA | tBA | St | nBA | tBA | Weight-average molecular weight | Acid value (mgKOH/g) |
|---|---|---|---|---|---|---|---|---|
| G1 | | 30.0 | 20.0 | 40.0 | 10.0 | | 9,000 | 140 |
| G2 | | 30.0 | 20.0 | 50.0 | | | 9,000 | 140 |
| G3 | 40.0 | 10.0 | | | 30.0 | 20.0 | 9,000 | 140 |
| G4 | 50.0 | | | | 30.0 | 20.0 | 9,000 | 140 |
| G5 | | 30.0 | 20.0 | | 30.0 | 20.0 | 9,000 | 140 |

Resins B1 to B7

In accordance with the following procedure, water-soluble resins B1 to B7 being block copolymers having an ester bond were synthesized. A four-necked flask equipped with a stirrer, a thermometer, a nitrogen inlet tube, and a reflux condenser was purged with nitrogen. In the flask, 100.0 parts of methyl ethyl ketone, a mixture of monomers for a first block in amounts shown in Table 8, 0.6 part of ethyl 2-bromoisobutyrate, and 1.5 parts of tetramethylethylenediamine were placed. The mixture was warmed to 40° C., and was purged with nitrogen for 30 minutes. Under a nitrogen atmosphere, the mixture was heated to 75° C., and then 0.6 part of cuprous chloride was added to start the reaction. A portion of the solution was sampled every certain time interval, and the dry solid content in the solution was determined to calculate the degree of polymerization. After the confirmation of a degree of polymerization of 95% or more, a mixture of monomers for a second block in amounts shown in Table 8 was added to continue the reaction.

After the confirmation of a final degree of polymerization of 98%, 50.0 parts of methyl ethyl ketone was added, and the flask was cooled in a water bath to terminate the reaction. The reaction product was filtrated through activated alumina to remove the copper complex. The filtrate was poured into an excess amount of methanol, and the resulting precipitate was dried under vacuum at 40° C. for 24 hours, giving resins B1 to B7. To the resin, 0.9 equivalent of potassium hydroxide relative to the acid value of the resin and an appropriate amount of ion-exchanged water were added to give a liquid having a resin content (solid content) of 20.0%.

Resin B8

In accordance with the following procedure, a water-soluble resin B8 being a block copolymer having an ester bond was synthesized. A four-necked flask equipped with a stirrer, a thermometer, a nitrogen inlet tube, and a reflux condenser was purged with nitrogen. In the flask, 100.0 parts of methyl ethyl ketone, a mixture of monomers for a first block in amounts shown in Table 8, 0.5 part of cumyl dithiobenzoate, and 0.1 part of azobisisobutyronitrile were placed. The mixture was purged with nitrogen at 25° C. for 30 minutes, and then was heated to 75° C. under a nitrogen atmosphere to start the reaction. A portion of the solution was sampled every certain time interval, and the dry solid content in the solution was determined to calculate the degree of polymerization. After the confirmation of a degree of polymerization of 95% or more, a mixture of monomers for a second block in amounts shown in Table 8 was added to continue the reaction.

After the confirmation of a final degree of polymerization of 98%, 50.0 parts of methyl ethyl ketone was added, and the flask was cooled in a water bath to stop the reaction. The reaction liquid was poured into an excess amount of methanol, and the resulting precipitate was dried under vacuum at 40° C. for 24 hours, giving a resin B8. To the resin, 0.9 equivalent of potassium hydroxide relative to the acid value of the resin and an appropriate amount of ion-exchanged water were added to give a liquid having a resin content (solid content) of 20.0%. The abbreviations in Table 8 mean the following substances.

St: styrene
BzMA: benzyl methacrylate
MMA: methyl methacrylate
HEMA: 2-hydroxyethyl methacrylate
MAA: methacrylic acid

TABLE 8

Synthetic conditions and properties of resins B1 to B8

| | Monomer for first block (parts) | | | | Monomer for second block (parts) | | Properties | |
|---|---|---|---|---|---|---|---|---|
| Resin | St | BzMA | MMA | HEMA | MMA | MAA | Weight-average molecular weight | Acid value (mgKOH/g) |
| B1 | | 30.0 | 20.0 | | 30.0 | 20.0 | 9,000 | 140 |
| B2 | 50.0 | | | | 30.0 | 20.0 | 9,000 | 140 |
| B3 | 20.0 | 30.0 | | | 30.0 | 20.0 | 9,000 | 140 |
| B4 | | | 50.0 | | 30.0 | 20.0 | 9,000 | 140 |
| B5 | | | | 50.0 | 30.0 | 20.0 | 9,000 | 140 |
| B6 | | 30.0 | 50.0 | | | 20.0 | 9,000 | 140 |
| B7 | | | | 90.0 | 10.0 | | 9,000 | 140 |
| B8 | | 30.0 | 20.0 | | 30.0 | 20.0 | 9,000 | 140 |

Resins E1 to E17

In accordance with the following procedure, resins E1 to E17 being resins having an ester bond (resin particle) were synthesized. A surfactant and monomers in amounts shown in Table 9 and 150.0 parts of ion-exchanged water were mixed with a homogenizer (trade name "T50D Ultra-Turrax", manufactured by IKA) to give a mixture. In a flask equipped with a stirrer, a nitrogen inlet tube, a reflux condenser, and a thermometer, 50.0 parts of the mixture was placed, and was heated to 90° C. under a nitrogen atmosphere with stirring. The remainder of the mixed liquid and a solution of 1.0 part of potassium persulfate in 20.0 parts of ion-exchanged water were each added dropwise over 2 hours. The inner temperature was maintained at 90° C., and the mixture was stirred and allowed to react for 2 hours, giving dispersion liquids containing resins E1 to E17. The pH of the obtained dispersion liquid was adjusted to 8.5 by using 1 mol/L aqueous potassium hydroxide, and an appropriate amount of ion-exchanged water was added to give a liquid having a resin content (solid content) of 20.0%. Each glass transition temperature of the resin particles E1 to E17 and the resin particles E18 and E19 prepared by the method described later was determined by the above method to be within a range of 10 to 150° C. The abbreviations in Table 9 mean the following substances.

MMA: methyl methacrylate
HEMA: 2-hydroxyethyl methacrylate
St: styrene
BzMA: benzyl methacrylate
CHMA: cyclohexyl methacrylate
EGDMA: ethylene dimethacrylate Surfactant 1: Aqualon KH-10, an anionic reactive surfactant, manufactured by Dai-ichi Kogyo Seiyaku
Surfactant 2: ADEKA REASOAP ER-20, a nonionic reactive surfactant, manufactured by ADEKA
Surfactant 3: PERETEX 1225, a nonionic surfactant, manufactured by Miyoshi Oil & Fat
Surfactant 4: FM-0711, a mono-terminal methacrylate of silicon, manufactured by JNC
Surfactant 5: FAAC-6, 2-(perfluorohexyl)ethyl acrylate, manufactured by Unimatec For the resin E19, third components in amounts shown in Table 10 and a solution of 0.5 part of potassium persulfate in 5.0 parts of ion-exchanged water were each added dropwise over 1 hour. Next, the inner temperature was maintained at 90° C., and the mixture was stirred and allowed to react for 2 hours, giving dispersion liquids containing resins E18 and E19. The pH of the obtained dispersion liquid was adjusted to 8.5 by using 1 mol/L aqueous potassium hydroxide, and an appropriate amount of ion-exchanged water was added to give a liquid having a resin content (solid content) of 20.0%. The abbreviations in Table 10 mean the following substances.

MMA: methyl methacrylate

EGDMA: ethylene dimethacrylate

MAA: methacrylic acid

Surfactant 1: Aqualon KH-10, an anionic reactive surfactant (manufactured by Dai-ichi Kogyo Seiyaku)

TABLE 9

Synthetic conditions and properties of resins E1 to E17

| Resin | Surfactant (parts) | | | | | Monomer (parts) | | | | | | | | | Properties Volume-average particle diameter (nm) |
| --- | --- | --- | --- | --- | --- | --- | --- | --- | --- | --- | --- | --- | --- | --- | --- |
| | 1 | 2 | 3 | 4 | 5 | MMA | HEMA | St | BzMA | CHMA | FM-0711 | FAAC-6 | EGDMA | MAA | |
| E1 | 3.0 | | | | | 100.0 | | | | | | | | | 150 |
| E2 | | 3.0 | | | | 100.0 | | | | | | | | | 150 |
| E3 | | | 3.0 | | | 100.0 | | | | | | | | | 150 |
| E4 | | | | 3.0 | | 100.0 | | | | | | | | | 150 |
| E5 | | | | | 3.0 | 100.0 | | | | | | | | | 150 |
| E6 | 3.0 | | | | | 80.0 | 20.0 | | | | | | | | 150 |
| E7 | 3.0 | | | | | 60.0 | | 40.0 | | | | | | | 150 |
| E8 | 3.0 | | | | | 60.0 | | | 40.0 | | | | | | 150 |
| E9 | 3.0 | | | | | 60.0 | | | | 40.0 | | | | | 150 |
| E10 | 3.0 | | | | | 80.0 | | | | | 20.0 | | | | 150 |
| E11 | 3.0 | | | | | 80.0 | | | | | | 20.0 | | | 150 |
| E12 | 3.0 | | | | | 80.0 | | | | | | | 20.0 | | 150 |
| E13 | 3.0 | | | | | 80.0 | | | | | | | | 20.0 | 150 |
| E14 | 5.0 | | | | | 100.0 | | | | | | | | | 45 |
| E15 | 4.0 | | | | | 100.0 | | | | | | | | | 50 |
| E16 | 1.0 | | | | | 100.0 | | | | | | | | | 300 |
| E17 | 0.5 | | | | | 100.0 | | | | | | | | | 320 |

Resins E18 and E19

In accordance with the following procedure, resins E18 and E19 as resins having an ester bond (resin particle) were prepared. In a flask equipped with a stirrer, a nitrogen inlet tube, a reflux condenser, and a thermometer, 150.0 parts of ion-exchanged water and first components in amounts shown in Table 10 were placed. The components were mixed with a homogenizer (trade name "T50D Ultra-Turrax", manufactured by IKA), and the mixture was heated to 90° C. under a nitrogen atmosphere with stirring. A solution of 0.5 part of potassium persulfate in 5.0 parts of ion-exchanged water was added dropwise over 1 hour. Next, second components in amounts shown in Table 10 and a solution of 0.5 part of potassium persulfate in 5.0 parts of ion-exchanged water were each added dropwise over 1 hour.

TABLE 10

Synthetic conditions and properties of resins E18 and E19

| Resin | First component | | Second component | | | | Third component | | | Properties Volume-average particle diameter (nm) |
| --- | --- | --- | --- | --- | --- | --- | --- | --- | --- | --- |
| | Surfactant 1 | MMA | Surfactant 1 | MMA | EGDMA | MAA | Surfactant 1 | EGDMA | MAA | |
| E18 | 1.8 | 60.0 | 1.2 | | 20.0 | 20.0 | | | | 150 |
| E19 | 1.2 | 40.0 | 0.9 | 20.0 | 5.0 | 5.0 | 0.9 | 15.0 | 15.0 | 150 |

Resins U1 to U10

In accordance with the following procedure, resins U1 to 10 having a urethane bond were synthesized. In a flask equipped with a stirrer, a nitrogen inlet tube, a reflux condenser, and a thermometer, a polyisocyanate and a polyol in amounts shown in Table 11 were placed, and were allowed to react at 100° C. for 2 hours under a nitrogen gas atmosphere. Next, a chain extender and a polyol having an acid group in amounts shown in Table 11 and 150.0 parts of methyl ethyl ketone were added to conduct reaction at 78° C. while the residual rate of isocyanate group was checked by FT-IR until an intended residual rate was achieved, giving a reaction liquid. The obtained reaction liquid was cooled to 40° C., and then an appropriate amount of ion-exchanged water was added. While the mixture was stirred at high speed with a homomixer, an equivalent of potassium hydroxide to the acid value was added. Methyl ethyl ketone was removed under reduced pressure, and a liquid having a resin content (solid content) of 20.0% was prepared. The abbreviations in Table 11 mean the following substances.
IPDI: isophorone diisocyanate
H12MDI: 4,4'-dicyclohexylmethane diisocyanate
HDI: hexamethylene diisocyanate
PES2000: a polyester polyol having a number-average molecular weight of 2,000
T6002: a polyhexamethylene carbonate diol having a number-average molecular weight of 2,000 (manufactured by Asahi Kasei Chemicals)
PPG2000: a polypropylene glycol having a number-average molecular weight of 2,000
PTMG2000: a polytetramethylene glycol having a number-average molecular weight of 2,000
PEG2000: a polyethylene glycol having a number-average molecular weight of 2,000
EDA: ethylenediamine
NPG: neopentyl glycol
DMPA: dimethylolpropionic acid

TABLE 11

Synthetic conditions and properties of resins U1 to U10

| Resin | Polyisocyanate (parts) | | | Polyol (parts) | | | | | Chain extender (parts) | | Polyol having acid group (parts) | Properties | | |
|---|---|---|---|---|---|---|---|---|---|---|---|---|---|---|
| | IPDI | H12MDI | HDI | PES 2000 | T6002 | PPG 2000 | PTMG 2000 | PEG 2000 | EDA | NPG | DMPA | Volume-average particle diameter (nm) | Weight-average molecular weight | Acid value (mgKOH/g) |
| U1 | 33.8 | | | | | 50.7 | | | 1.2 | | 14.3 | 10 | 30,000 | 60 |
| U2 | | 37.4 | | | | 47.6 | | | 0.7 | | 14.3 | 10 | 30,000 | 60 |
| U3 | | | 28.1 | | | 55.7 | | | 1.9 | | 14.3 | 10 | 30,000 | 60 |
| U4 | 33.8 | | | 50.7 | | | | | 1.2 | | 14.3 | 10 | 30,000 | 60 |
| U5 | 32.8 | | | | 50.7 | | | | 2.2 | | 14.3 | 10 | 30,000 | 60 |
| U6 | 32.8 | | | | | | 50.7 | | 2.2 | | 14.3 | 10 | 30,000 | 60 |
| U7 | 32.8 | | | | | | | 50.7 | 2.2 | | 14.3 | 10 | 30,000 | 60 |
| U8 | 33.5 | | | | | 50.3 | | | | 1.9 | 14.3 | 10 | 30,000 | 60 |
| U9 | 35.3 | | | | | 48.8 | | | 1.6 | | 14.3 | 15 | 30,000 | 60 |
| U10 | 36.6 | | | | | 47.0 | | | 2.1 | | 14.3 | 20 | 30,000 | 60 |

Preparation of Ink

Components (unit: %) shown below were mixed and thoroughly stirred, and the resulting mixtures were subjected to pressure filtration through a microfilter with a pore size of 2.5 μm (manufactured by Fujifilm Corporation), giving inks. In Comparative Example 2, 0.012% of a binding compound of a peptidoglycan and a lipopolysaccharide extracted from a culture of a Gram-negative bacterium (*E. coli*) was used in addition to components shown below, and the ink was prepared. Properties of the prepared inks are shown in Table 13.

A pigment dispersion liquid shown in Table 12: amount shown in Table 12
Liquids containing resins shown in Table 12: amounts shown in Table 12
Glycerol: 5.0%
Triethylene glycol: 10.0%
Acetylenol E100: 0.1%
Ion-exchanged water: residual amount to give a component total amount of 100.0%

TABLE 12

Formulation of ink

| | | Pigment dispersion liquid | | Liquid containing resin | | | | | |
|---|---|---|---|---|---|---|---|---|---|
| | | Type | Amount (%) | Resin | Amount (%) | Resin | Amount (%) | Resin | Amount (%) |
| Example | 1 | II-1 | 26.7 | B1 | 10.0 | E1 | 20.0 | U1 | 10.0 |
| | 2 | II-2 | 26.7 | B1 | 10.0 | E1 | 20.0 | U1 | 10.0 |

TABLE 12-continued

| | | Formulation of ink | | | | | | |
|---|---|---|---|---|---|---|---|---|
| | | Pigment dispersion liquid | | Liquid containing resin | | | | |
| | | Type | Amount (%) | Resin | Amount (%) | Resin | Amount (%) | Resin | Amount (%) |

| | Type | Amount (%) | Resin | Amount (%) | Resin | Amount (%) | Resin | Amount (%) |
|---|---|---|---|---|---|---|---|---|
| 3 | II-3 | 26.7 | B1 | 10.0 | E1 | 20.0 | U1 | 10.0 |
| 4 | II-4 | 26.7 | B1 | 10.0 | E1 | 20.0 | U1 | 10.0 |
| 5 | II-5 | 26.7 | B1 | 10.0 | E1 | 20.0 | U1 | 10.0 |
| 6 | II-6 | 26.7 | B1 | 10.0 | E1 | 20.0 | U1 | 10.0 |
| 7 | II-7 | 26.7 | B1 | 10.0 | E1 | 20.0 | U1 | 10.0 |
| 8 | II-8 | 26.7 | B1 | 10.0 | E1 | 20.0 | U1 | 10.0 |
| 9 | II-9 | 26.7 | B1 | 10.0 | E1 | 20.0 | U1 | 10.0 |
| 10 | II-10 | 26.7 | B1 | 10.0 | E1 | 20.0 | U1 | 10.0 |
| 11 | II-11 | 26.7 | B1 | 10.0 | E1 | 20.0 | U1 | 10.0 |
| 12 | II-12 | 26.7 | B1 | 10.0 | E1 | 20.0 | U1 | 10.0 |
| 13 | II-13 | 26.7 | B1 | 10.0 | E1 | 20.0 | U1 | 10.0 |
| 14 | II-14 | 26.7 | B1 | 10.0 | E1 | 20.0 | U1 | 10.0 |
| 15 | II-15 | 26.7 | B1 | 10.0 | E1 | 20.0 | U1 | 10.0 |
| 16 | II-16 | 26.7 | B1 | 10.0 | E1 | 20.0 | U1 | 10.0 |
| 17 | II-17 | 26.7 | B1 | 10.0 | E1 | 20.0 | U1 | 10.0 |
| 18 | II-18 | 26.7 | B1 | 10.0 | E1 | 20.0 | U1 | 10.0 |
| 19 | II-19 | 26.7 | B1 | 10.0 | E1 | 20.0 | U1 | 10.0 |
| 20 | II-20 | 26.7 | B1 | 10.0 | E1 | 20.0 | U1 | 10.0 |
| 21 | II-21 | 26.7 | B1 | 10.0 | E1 | 20.0 | U1 | 10.0 |
| 22 | II-22 | 26.7 | B1 | 10.0 | E1 | 20.0 | U1 | 10.0 |
| 23 | II-23 | 26.7 | B1 | 10.0 | E1 | 20.0 | U1 | 10.0 |
| 24 | II-24 | 26.7 | B1 | 10.0 | E1 | 20.0 | U1 | 10.0 |
| 25 | II-25 | 26.7 | B1 | 10.0 | E1 | 20.0 | U1 | 10.0 |
| 26 | II-26 | 26.7 | B1 | 10.0 | E1 | 20.0 | U1 | 10.0 |
| 27 | II-27 | 26.7 | B1 | 10.0 | E1 | 20.0 | U1 | 10.0 |
| 28 | II-28 | 26.7 | B1 | 10.0 | E1 | 20.0 | U1 | 10.0 |
| 29 | II-29 | 26.7 | B1 | 10.0 | E1 | 20.0 | U1 | 10.0 |
| 30 | II-30 | 26.7 | B1 | 10.0 | E1 | 20.0 | U1 | 10.0 |
| 31 | II-31 | 26.7 | B1 | 10.0 | E1 | 20.0 | U1 | 10.0 |
| 32 | II-32 | 26.7 | B1 | 10.0 | E1 | 20.0 | U1 | 10.0 |
| 33 | II-1 | 26.7 | B1 | 10.0 | E1 | 20.0 | U2 | 10.0 |
| 34 | II-1 | 26.7 | B1 | 10.0 | E1 | 20.0 | U3 | 10.0 |
| 35 | II-1 | 26.7 | B1 | 10.0 | E1 | 20.0 | U4 | 10.0 |
| 36 | II-1 | 26.7 | B1 | 10.0 | E1 | 20.0 | U5 | 10.0 |
| 37 | II-1 | 26.7 | B1 | 10.0 | E1 | 20.0 | U6 | 10.0 |
| 38 | II-1 | 26.7 | B1 | 10.0 | E1 | 20.0 | U7 | 10.0 |
| 39 | II-1 | 26.7 | B1 | 10.0 | E1 | 20.0 | U8 | 10.0 |
| 40 | II-1 | 26.7 | B2 | 10.0 | E1 | 20.0 | U1 | 10.0 |
| 41 | II-1 | 26.7 | B3 | 10.0 | E1 | 20.0 | U1 | 10.0 |
| 42 | II-1 | 26.7 | B4 | 10.0 | E1 | 20.0 | U1 | 10.0 |
| 43 | II-1 | 26.7 | B5 | 10.0 | E1 | 20.0 | U1 | 10.0 |
| 44 | II-1 | 26.7 | B6 | 10.0 | E1 | 20.0 | U1 | 10.0 |
| 45 | II-1 | 26.7 | B8 | 10.0 | E1 | 20.0 | U1 | 10.0 |
| 46 | II-1 | 26.7 | B1 | 10.0 | E2 | 20.0 | U1 | 10.0 |
| 47 | II-1 | 26.7 | B1 | 10.0 | E3 | 20.0 | U1 | 10.0 |
| 48 | II-1 | 26.7 | B1 | 10.0 | E4 | 20.0 | U1 | 10.0 |
| 49 | II-1 | 26.7 | B1 | 10.0 | E5 | 20.0 | U1 | 10.0 |
| 50 | II-1 | 26.7 | B1 | 10.0 | E6 | 20.0 | U1 | 10.0 |
| 51 | II-1 | 26.7 | B1 | 10.0 | E7 | 20.0 | U1 | 10.0 |
| 52 | II-1 | 26.7 | B1 | 10.0 | E8 | 20.0 | U1 | 10.0 |
| 53 | II-1 | 26.7 | B1 | 10.0 | E9 | 20.0 | U1 | 10.0 |
| 54 | II-1 | 26.7 | B1 | 10.0 | E10 | 20.0 | U1 | 10.0 |
| 55 | II-1 | 26.7 | B1 | 10.0 | E11 | 20.0 | U1 | 10.0 |
| 56 | II-1 | 26.7 | B1 | 10.0 | E12 | 20.0 | U1 | 10.0 |
| 57 | II-1 | 26.7 | B1 | 10.0 | E13 | 20.0 | U1 | 10.0 |
| 58 | II-1 | 26.7 | B1 | 10.0 | E18 | 20.0 | U1 | 10.0 |
| 59 | II-1 | 26.7 | B1 | 10.0 | E19 | 20.0 | U1 | 10.0 |
| 60 | II-1 | 26.7 | U1 | 10.0 | | | | |
| 61 | II-1 | 26.7 | U1 | 0.8 | | | | |
| 62 | II-1 | 26.7 | U1 | 1.0 | | | | |
| 63 | II-1 | 6.7 | U1 | 10.0 | | | | |
| 64 | II-1 | 6.7 | U1 | 11.0 | | | | |
| 65 | II-1 | 26.7 | U9 | 10.0 | | | | |
| 66 | II-1 | 26.7 | U10 | 10.0 | | | | |
| 67 | II-1 | 26.7 | B1 | 10.0 | | | | |
| 68 | II-1 | 26.7 | B1 | 0.8 | | | | |
| 69 | II-1 | 26.7 | B1 | 1.0 | | | | |
| 70 | II-1 | 6.7 | B1 | 10.0 | | | | |
| 71 | II-1 | 6.7 | B1 | 11.0 | | | | |
| 72 | II-1 | 26.7 | B7 | 10.0 | | | | |
| 73 | II-1 | 26.7 | E1 | 20.0 | | | | |
| 74 | II-1 | 26.7 | E1 | 1.0 | | | | |
| 75 | II-1 | 26.7 | E1 | 2.0 | | | | |

TABLE 12-continued

| | | Formulation of ink | | | | | | |
|---|---|---|---|---|---|---|---|---|
| | | Pigment dispersion liquid | | Liquid containing resin | | | | |
| | | Type | Amount (%) | Resin | Amount (%) | Resin | Amount (%) | Resin | Amount (%) |
| | 76 | II-1 | 6.7 | E1 | 50.0 | | | | |
| | 77 | II-1 | 6.7 | E1 | 55.0 | | | | |
| | 78 | II-1 | 26.7 | E14 | 20.0 | | | | |
| | 79 | II-1 | 26.7 | E15 | 20.0 | | | | |
| | 80 | II-1 | 26.7 | E16 | 20.0 | | | | |
| | 81 | II-1 | 26.7 | E17 | 20.0 | | | | |
| | 82 | II-31 | 26.7 | B1 | 10.0 | U1 | 10.0 | | |
| | 83 | II-31 | 26.7 | E1 | 20.0 | U1 | 10.0 | | |
| | 84 | II-31 | 26.7 | B1 | 10.0 | E1 | 20.0 | | |
| | 85 | II-1 | 26.7 | R4 | 10.0 | | | | |
| | 86 | II-1 | 26.7 | R5 | 10.0 | | | | |
| | 87 | II-1 | 26.7 | R6 | 10.0 | | | | |
| | 88 | II-1 | 26.7 | R7 | 10.0 | | | | |
| | 89 | II-1 | 26.7 | R2 | 10.0 | | | | |
| | 90 | II-1 | 26.7 | R8 | 10.0 | | | | |
| | 91 | II-1 | 26.7 | R9 | 10.0 | | | | |
| | 92 | II-1 | 26.7 | R10 | 10.0 | | | | |
| | 93 | II-1 | 26.7 | G1 | 10.0 | | | | |
| | 94 | II-1 | 26.7 | G2 | 10.0 | | | | |
| | 95 | II-1 | 26.7 | G3 | 10.0 | | | | |
| | 96 | II-1 | 26.7 | G4 | 10.0 | | | | |
| | 97 | II-1 | 26.7 | G5 | 10.0 | | | | |
| Comparative Example | 1 | II-33 | 26.7 | B1 | 10.0 | E1 | 20.0 | U1 | 10.0 |
| | 2 | II-33 | 26.7 | B1 | 10.0 | E1 | 20.0 | U1 | 10.0 |
| | 3 | II-16 | 26.7 | | | | | | |

TABLE 13

| | | Properties of ink | | | | | | | | | | | | |
|---|---|---|---|---|---|---|---|---|---|---|---|---|---|---|
| | | Pigment | Resin having ester bond | | Resin having urethane bond | | Resin having amide bond | | Resin having ether bond | | Block copolymer | Resin particle | Urethane resin |
| | | P(%) | Resin | (%) | Resin | (%) | Resin | (%) | Resin | (%) | Resin | (%) | B(%) | E(%) | U(%) |
| Example | 1 | 4.0 | B1 | 2.0 | E1 | 4.0 | U1 | 2.0 | | | | | 2.0 | 4.0 | 2.0 |
| | 2 | 4.0 | B1 | 2.0 | E1 | 4.0 | U1 | 2.0 | | | | | 2.0 | 4.0 | 2.0 |
| | 3 | 4.0 | B1 | 2.0 | E1 | 4.0 | U1 | 2.0 | | | | | 2.0 | 4.0 | 2.0 |
| | 4 | 4.0 | B1 | 2.0 | E1 | 4.0 | U1 | 2.0 | | | | | 2.0 | 4.0 | 2.0 |
| | 5 | 4.0 | B1 | 2.0 | E1 | 4.0 | U1 | 2.0 | | | | | 2.0 | 4.0 | 2.0 |
| | 6 | 4.0 | B1 | 2.0 | E1 | 4.0 | U1 | 2.0 | | | | | 2.0 | 4.0 | 2.0 |
| | 7 | 4.0 | B1 | 2.0 | E1 | 4.0 | U1 | 2.0 | | | | | 2.0 | 4.0 | 2.0 |
| | 8 | 4.0 | B1 | 2.0 | E1 | 4.0 | U1 | 2.0 | | | | | 2.0 | 4.0 | 2.0 |
| | 9 | 4.0 | B1 | 2.0 | E1 | 4.0 | U1 | 2.0 | | | | | 2.0 | 4.0 | 2.0 |
| | 10 | 4.0 | B1 | 2.0 | E1 | 4.0 | U1 | 2.0 | | | | | 2.0 | 4.0 | 2.0 |
| | 11 | 4.0 | B1 | 2.0 | E1 | 4.0 | U1 | 2.0 | | | | | 2.0 | 4.0 | 2.0 |
| | 12 | 4.0 | B1 | 2.0 | E1 | 4.0 | U1 | 2.0 | | | | | 2.0 | 4.0 | 2.0 |
| | 13 | 4.0 | B1 | 2.0 | E1 | 4.0 | U1 | 2.0 | | | | | 2.0 | 4.0 | 2.0 |
| | 14 | 4.0 | B1 | 2.0 | E1 | 4.0 | U1 | 2.0 | | | | | 2.0 | 4.0 | 2.0 |
| | 15 | 4.0 | B1 | 2.0 | E1 | 4.0 | U1 | 2.0 | | | | | 2.0 | 4.0 | 2.0 |
| | 16 | 4.0 | B1 | 2.0 | E1 | 4.0 | U1 | 2.0 | | | | | 2.0 | 4.0 | 2.0 |
| | 17 | 4.0 | B1 | 2.0 | E1 | 4.0 | U1 | 2.0 | | | | | 2.0 | 4.0 | 2.0 |
| | 18 | 4.0 | B1 | 2.0 | E1 | 4.0 | U1 | 2.0 | | | | | 2.0 | 4.0 | 2.0 |
| | 19 | 4.0 | B1 | 2.0 | E1 | 4.0 | U1 | 2.0 | | | | | 2.0 | 4.0 | 2.0 |
| | 20 | 4.0 | B1 | 2.0 | E1 | 4.0 | U1 | 2.0 | | | | | 2.0 | 4.0 | 2.0 |
| | 21 | 4.0 | B1 | 2.0 | E1 | 4.0 | U1 | 2.0 | | | | | 2.0 | 4.0 | 2.0 |
| | 22 | 4.0 | B1 | 2.0 | E1 | 4.0 | U1 | 2.0 | | | | | 2.0 | 4.0 | 2.0 |
| | 23 | 4.0 | B1 | 2.0 | E1 | 4.0 | U1 | 2.0 | | | | | 2.0 | 4.0 | 2.0 |
| | 24 | 4.0 | B1 | 2.0 | E1 | 4.0 | U1 | 2.0 | | | | | 2.0 | 4.0 | 2.0 |
| | 25 | 4.0 | B1 | 2.0 | E1 | 4.0 | U1 | 2.0 | | | | | 2.0 | 4.0 | 2.0 |
| | 26 | 4.0 | B1 | 2.0 | E1 | 4.0 | U1 | 2.0 | | | | | 2.0 | 4.0 | 2.0 |
| | 27 | 4.0 | B1 | 2.0 | E1 | 4.0 | U1 | 2.0 | | | | | 2.0 | 4.0 | 2.0 |
| | 28 | 4.0 | B1 | 2.0 | E1 | 4.0 | U1 | 2.0 | | | | | 2.0 | 4.0 | 2.0 |
| | 29 | 4.0 | B1 | 2.0 | E1 | 4.0 | U1 | 2.0 | | | | | 2.0 | 4.0 | 2.0 |
| | 30 | 4.0 | B1 | 2.0 | E1 | 4.0 | U1 | 2.0 | | | | | 2.0 | 4.0 | 2.0 |
| | 31 | 4.0 | B1 | 2.0 | E1 | 4.0 | U1 | 2.0 | | | | | 2.0 | 4.0 | 2.0 |
| | 32 | 4.0 | B1 | 2.0 | E1 | 4.0 | U1 | 2.0 | | | | | 2.0 | 4.0 | 2.0 |
| | 33 | 4.0 | B1 | 2.0 | E1 | 4.0 | U2 | 2.0 | | | | | 2.0 | 4.0 | 2.0 |
| | 34 | 4.0 | B1 | 2.0 | E1 | 4.0 | U3 | 2.0 | | | | | 2.0 | 4.0 | 2.0 |
| | 35 | 4.0 | B1 | 2.0 | E1 | 4.0 | U4 | 2.0 | | | | | 2.0 | 4.0 | 2.0 |

TABLE 13-continued

| | | Pigment | Resin having ester bond | | Resin having urethane bond | | Resin having amide bond | | Resin having ether bond | | Block copolymer | Resin particle | Urethane resin |
|---|---|---|---|---|---|---|---|---|---|---|---|---|---|
| | | P(%) | Resin | (%) | Resin | (%) | Resin | (%) | Resin | (%) | B(%) | E(%) | U(%) |
| | 36 | 4.0 | B1 | 2.0 | E1 | 4.0 | U5 | 2.0 | | | 2.0 | 4.0 | 2.0 |
| | 37 | 4.0 | B1 | 2.0 | E1 | 4.0 | U6 | 2.0 | | | 2.0 | 4.0 | 2.0 |
| | 38 | 4.0 | B1 | 2.0 | E1 | 4.0 | U7 | 2.0 | | | 2.0 | 4.0 | 2.0 |
| | 39 | 4.0 | B1 | 2.0 | E1 | 4.0 | U8 | 2.0 | | | 2.0 | 4.0 | 2.0 |
| | 40 | 4.0 | B2 | 2.0 | E1 | 4.0 | U1 | 2.0 | | | 2.0 | 4.0 | 2.0 |
| | 41 | 4.0 | B3 | 2.0 | E1 | 4.0 | U1 | 2.0 | | | 2.0 | 4.0 | 2.0 |
| | 42 | 4.0 | B4 | 2.0 | E1 | 4.0 | U1 | 2.0 | | | 2.0 | 4.0 | 2.0 |
| | 43 | 4.0 | B5 | 2.0 | E1 | 4.0 | U1 | 2.0 | | | 2.0 | 4.0 | 2.0 |
| | 44 | 4.0 | B6 | 2.0 | E1 | 4.0 | U1 | 2.0 | | | 2.0 | 4.0 | 2.0 |
| | 45 | 4.0 | B8 | 2.0 | E1 | 4.0 | U1 | 2.0 | | | 2.0 | 4.0 | 2.0 |
| | 46 | 4.0 | B1 | 2.0 | E2 | 4.0 | U1 | 2.0 | | | 2.0 | 4.0 | 2.0 |
| | 47 | 4.0 | B1 | 2.0 | E3 | 4.0 | U1 | 2.0 | | | 2.0 | 4.0 | 2.0 |
| | 48 | 4.0 | B1 | 2.0 | E4 | 4.0 | U1 | 2.0 | | | 2.0 | 4.0 | 2.0 |
| | 49 | 4.0 | B1 | 2.0 | E5 | 4.0 | U1 | 2.0 | | | 2.0 | 4.0 | 2.0 |
| | 50 | 4.0 | B1 | 2.0 | E6 | 4.0 | U1 | 2.0 | | | 2.0 | 4.0 | 2.0 |
| | 51 | 4.0 | B1 | 2.0 | E7 | 4.0 | U1 | 2.0 | | | 2.0 | 4.0 | 2.0 |
| | 52 | 4.0 | B1 | 2.0 | E8 | 4.0 | U1 | 2.0 | | | 2.0 | 4.0 | 2.0 |
| | 53 | 4.0 | B1 | 2.0 | E9 | 4.0 | U1 | 2.0 | | | 2.0 | 4.0 | 2.0 |
| | 54 | 4.0 | B1 | 2.0 | E10 | 4.0 | U1 | 2.0 | | | 2.0 | 4.0 | 2.0 |
| | 55 | 4.0 | B1 | 2.0 | E11 | 4.0 | U1 | 2.0 | | | 2.0 | 4.0 | 2.0 |
| | 56 | 4.0 | B1 | 2.0 | E12 | 4.0 | U1 | 2.0 | | | 2.0 | 4.0 | 2.0 |
| | 57 | 4.0 | B1 | 2.0 | E13 | 4.0 | U1 | 2.0 | | | 2.0 | 4.0 | 2.0 |
| | 58 | 4.0 | B1 | 2.0 | E18 | 4.0 | U1 | 2.0 | | | 2.0 | 4.0 | 2.0 |
| | 59 | 4.0 | B1 | 2.0 | E19 | 4.0 | U1 | 2.0 | | | 2.0 | 4.0 | 2.0 |
| | 60 | 4.0 | | | | | U1 | 2.0 | | | | | 2.0 |
| | 61 | 4.0 | | | | | U1 | 0.16 | | | | | 0.16 |
| | 62 | 4.0 | | | | | U1 | 0.2 | | | | | 0.2 |
| | 63 | 1.0 | | | | | U1 | 2.0 | | | | | 2.0 |
| | 64 | 1.0 | | | | | U1 | 2.2 | | | | | 2.2 |
| | 65 | 4.0 | | | | | U9 | 2.0 | | | | | 2.0 |
| | 66 | 4.0 | | | | | U10 | 2.0 | | | | | 2.0 |
| | 67 | 4.0 | B1 | 2.0 | | | | | | | 2.0 | | |
| | 68 | 4.0 | B1 | 0.16 | | | | | | | 0.16 | | |
| | 69 | 4.0 | B1 | 0.2 | | | | | | | 0.2 | | |
| | 70 | 1.0 | B1 | 2.0 | | | | | | | 2.0 | | |
| | 71 | 1.0 | B1 | 2.2 | | | | | | | 2.2 | | |
| | 72 | 4.0 | B7 | 2.0 | | | | | | | 2.0 | | |
| | 73 | 4.0 | E1 | 4.0 | | | | | | | | 4.0 | |
| | 74 | 4.0 | E1 | 0.2 | | | | | | | | 0.2 | |
| | 75 | 4.0 | E1 | 0.4 | | | | | | | | 0.4 | |
| | 76 | 1.0 | E1 | 10.0 | | | | | | | | 10.0 | |
| | 77 | 1.0 | E1 | 11.0 | | | | | | | | 11.0 | |
| | 78 | 4.0 | E14 | 4.0 | | | | | | | | 4.0 | |
| | 79 | 4.0 | E15 | 4.0 | | | | | | | | 4.0 | |
| | 80 | 4.0 | E16 | 4.0 | | | | | | | | 4.0 | |
| | 81 | 4.0 | E17 | 4.0 | | | | | | | | 4.0 | |
| | 82 | 4.0 | B1 | 2.0 | | | U1 | 2.0 | | | 2.0 | | 2.0 |
| | 83 | 4.0 | E1 | 4.0 | | | U1 | 2.0 | | | | 4.0 | 2.0 |
| | 84 | 4.0 | B1 | 2.0 | E1 | 4.0 | | | | | 2.0 | 4.0 | |
| | 85 | 4.0 | | | | | | | R4 | 2.0 | | | |
| | 86 | 4.0 | | | | | | | R5 | 2.0 | | | |
| | 87 | 4.0 | | | | | | | R6 | 2.0 | | | |
| | 88 | 4.0 | | | | | | | R7 | 2.0 | | | |
| | 89 | 4.0 | R2 | 2.0 | | | | | | | | | |
| | 90 | 4.0 | R8 | 2.0 | | | | | | | | | |
| | 91 | 4.0 | R9 | 2.0 | | | | | | | | | |
| | 92 | 4.0 | R10 | 2.0 | | | | | | | | | |
| | 93 | 4.0 | G1 | 2.0 | | | | | | | | | |
| | 94 | 4.0 | G2 | 2.0 | | | | | | | | | |
| | 95 | 4.0 | G3 | 2.0 | | | | | | | | | |
| | 96 | 4.0 | G4 | 2.0 | | | | | | | | | |
| | 97 | 4.0 | G5 | 2.0 | | | | | | | | | |
| Comparative Example | 1 | 4.0 | B1 | 2.0 | E1 | 4.0 | U1 | 2.0 | | | 2.0 | 4.0 | 2.0 |
| | 2 | 4.0 | B1 | 2.0 | E1 | 4.0 | U1 | 2.0 | | | 2.0 | 4.0 | 2.0 |
| | 3 | 4.0 | | | | | | | | | | | |

Evaluation

Each prepared ink was filled in an ink cartridge, and the ink cartridge was installed in an ink jet recording apparatus (trade name "PIXUS Pro 9500", manufactured by Canon) equipped with a recording head that ejects an ink by thermal energy. In the examples, the solid image recorded under conditions in which 28 ng of an ink is applied to a unit area of 1/600 inch×1/600 inch is defined as "a recording duty of 100%". In the present invention, "AA", "A", and "B" were regarded as an acceptable level, and "C" was regarded as an unacceptable level based on the following criteria of each item. The evaluation results are shown in right columns in Table 14.

Abrasion Resistance

The above ink jet recording apparatus was used to record a 10 cm×15 cm solid image at a recording duty of 100% on a recording medium (plain paper, trade name "PB PAPER GF-500", manufactured by Canon) to give a recorded product. To a color fastness rubbing tester (manufactured by Yasuda Seiki Seisakusho), the above recording medium was fixed for a friction block, and the solid image area on the recorded product was rubbed with the friction block predetermined times at a load of 1.96 N. Then, the solid image was visually observed to evaluate the abrasion resistance of the image based on the following criteria. Of the evaluation results, "AA'" and "AA''" are included in "AA" in the criteria shown below, where "AA" is superior to "AA'", and "AA'" is superior to "AA''".

AA: No scratch was observed on an image even after 30 strokes of rubbing.
A: Scratches were observed on an image after 20 strokes of rubbing, but no scratch was observed on the image after 10 strokes of rubbing.
B: Scratches were observed on an image after 10 strokes of rubbing, but no scratch was observed on the image after 5 strokes of rubbing.
C: Scratches were observed on an image after 5 strokes of rubbing.

Bronzing Resistance

The above ink jet recording apparatus was used to record a 10 cm×15 cm solid image at a recording duty of 100% on a recording medium (glossy paper, trade name "Canon Photo Paper, Glossy Gold, GL-101", manufactured by Canon) to give a recorded product. In accordance with Japanese Patent Application Laid-Open No. 2011-174046, $a^*_{45}$ and $b^*_{45}$ of the solid image area on the recorded product were determined, and the bronzing value B was calculated in accordance with the equation: $B=(a^{*2}_{45}+b^{*2}_{45})^{0.5}$. For the measurement, a gonio-spectrophotometric color measurement system (trade name "GCMS-3B", manufactured by Murakami Color Research Laboratory) was used. As for the measurement conditions, the light source was D65, the viewing angle was 2°, the incidence angle was 45°, the reflection angle was 45°, the tilt angle was 0°, and the in-plane rotation angle was 0°.

From the calculated bronzing value B, the bronzing resistance of an image was evaluated based on the following criteria. A smaller bronzing value B indicates that the occurrence of bronzing phenomenon is further suppressed.
AA: The bronzing value B was less than 10.
A: The bronzing value B was 10 or more to less than 15.
B: The bronzing value B was 15 or more to less than 20.
C: The bronzing value B was 20 or more.

TABLE 14

Properties and evaluation result of ink

|  |  | B/P (times) | E/P (times) | U/P (times) | Abrasion resistance | Bronzing resistance |
|---|---|---|---|---|---|---|
| Example | 1 | 0.50 | 1.00 | 0.50 | AA | AA |
|  | 2 | 0.50 | 1.00 | 0.50 | AA | AA |
|  | 3 | 0.50 | 1.00 | 0.50 | AA | AA |
|  | 4 | 0.50 | 1.00 | 0.50 | AA | AA |
|  | 5 | 0.50 | 1.00 | 0.50 | AA | AA |

TABLE 14-continued

Properties and evaluation result of ink

|  | B/P (times) | E/P (times) | U/P (times) | Abrasion resistance | Bronzing resistance |
|---|---|---|---|---|---|
| 6 | 0.50 | 1.00 | 0.50 | AA | AA |
| 7 | 0.50 | 1.00 | 0.50 | AA | AA |
| 8 | 0.50 | 1.00 | 0.50 | AA | AA |
| 9 | 0.50 | 1.00 | 0.50 | AA | AA |
| 10 | 0.50 | 1.00 | 0.50 | AA | AA |
| 11 | 0.50 | 1.00 | 0.50 | AA | AA |
| 12 | 0.50 | 1.00 | 0.50 | AA | AA |
| 13 | 0.50 | 1.00 | 0.50 | AA | AA |
| 14 | 0.50 | 1.00 | 0.50 | AA | AA |
| 15 | 0.50 | 1.00 | 0.50 | AA | AA |
| 16 | 0.50 | 1.00 | 0.50 | AA | AA |
| 17 | 0.50 | 1.00 | 0.50 | AA | AA |
| 18 | 0.50 | 1.00 | 0.50 | AA | AA |
| 19 | 0.50 | 1.00 | 0.50 | AA | AA |
| 20 | 0.50 | 1.00 | 0.50 | AA | AA |
| 21 | 0.50 | 1.00 | 0.50 | AA | AA |
| 22 | 0.50 | 1.00 | 0.50 | AA | AA |
| 23 | 0.50 | 1.00 | 0.50 | AA' | AA |
| 24 | 0.50 | 1.00 | 0.50 | AA' | AA |
| 25 | 0.50 | 1.00 | 0.50 | A | A |
| 26 | 0.50 | 1.00 | 0.50 | AA | AA |
| 27 | 0.50 | 1.00 | 0.50 | AA | AA |
| 28 | 0.50 | 1.00 | 0.50 | A | AA |
| 29 | 0.50 | 1.00 | 0.50 | A | A |
| 30 | 0.50 | 1.00 | 0.50 | AA | AA |
| 31 | 0.50 | 1.00 | 0.50 | AA | AA |
| 32 | 0.50 | 1.00 | 0.50 | AA | AA |
| 33 | 0.50 | 1.00 | 0.50 | AA | AA |
| 34 | 0.50 | 1.00 | 0.50 | AA | AA |
| 35 | 0.50 | 1.00 | 0.50 | AA | AA |
| 36 | 0.50 | 1.00 | 0.50 | AA | AA |
| 37 | 0.50 | 1.00 | 0.50 | AA | AA |
| 38 | 0.50 | 1.00 | 0.50 | AA | AA |
| 39 | 0.50 | 1.00 | 0.50 | AA | AA |
| 40 | 0.50 | 1.00 | 0.50 | AA | AA |
| 41 | 0.50 | 1.00 | 0.50 | AA | AA |
| 42 | 0.50 | 1.00 | 0.50 | AA | AA |
| 43 | 0.50 | 1.00 | 0.50 | AA | AA |
| 44 | 0.50 | 1.00 | 0.50 | AA | AA |
| 45 | 0.50 | 1.00 | 0.50 | AA | AA |
| 46 | 0.50 | 1.00 | 0.50 | AA | AA |
| 47 | 0.50 | 1.00 | 0.50 | AA | AA |
| 48 | 0.50 | 1.00 | 0.50 | AA | AA |
| 49 | 0.50 | 1.00 | 0.50 | AA | AA |
| 50 | 0.50 | 1.00 | 0.50 | AA | AA |
| 51 | 0.50 | 1.00 | 0.50 | AA | AA |
| 52 | 0.50 | 1.00 | 0.50 | AA | AA |
| 53 | 0.50 | 1.00 | 0.50 | AA | AA |
| 54 | 0.50 | 1.00 | 0.50 | AA | AA |
| 55 | 0.50 | 1.00 | 0.50 | AA | AA |
| 56 | 0.50 | 1.00 | 0.50 | AA | AA |
| 57 | 0.50 | 1.00 | 0.50 | AA | AA |
| 58 | 0.50 | 1.00 | 0.50 | AA | AA |
| 59 | 0.50 | 1.00 | 0.50 | AA | AA |
| 60 | 0.00 | 0.00 | 0.50 | AA'' | A |
| 61 | 0.00 | 0.00 | 0.04 | A | B |
| 62 | 0.00 | 0.00 | 0.05 | AA'' | A |
| 63 | 0.00 | 0.00 | 2.00 | AA'' | A |
| 64 | 0.00 | 0.00 | 2.20 | A | A |
| 65 | 0.00 | 0.00 | 0.50 | AA | A |
| 66 | 0.00 | 0.00 | 0.50 | A | B |
| 67 | 0.50 | 0.00 | 0.00 | A | AA |
| 68 | 0.04 | 0.00 | 0.00 | B | A |
| 69 | 0.05 | 0.00 | 0.00 | A | AA |
| 70 | 2.00 | 0.00 | 0.00 | A | AA |
| 71 | 2.20 | 0.00 | 0.00 | B | A |
| 72 | 0.50 | 0.00 | 0.00 | B | A |
| 73 | 0.00 | 1.00 | 0.00 | AA'' | A |
| 74 | 0.00 | 0.05 | 0.00 | A | A |
| 75 | 0.00 | 0.10 | 0.00 | AA'' | A |
| 76 | 0.00 | 10.00 | 0.00 | AA'' | A |
| 77 | 0.00 | 11.00 | 0.00 | A | B |
| 78 | 0.00 | 1.00 | 0.00 | A | B |

TABLE 14-continued

Properties and evaluation result of ink

| | | B/P (times) | E/P (times) | U/P (times) | Abrasion resistance | Bronzing resistance |
|---|---|---|---|---|---|---|
| | 79 | 0.00 | 1.00 | 0.00 | AA" | A |
| | 80 | 0.00 | 1.00 | 0.00 | AA" | A |
| | 81 | 0.00 | 1.00 | 0.00 | A | A |
| | 82 | 0.50 | 0.00 | 0.00 | AA' | AA |
| | 83 | 0.00 | 1.00 | 0.50 | AA' | A |
| | 84 | 0.50 | 1.00 | 0.00 | AA' | AA |
| | 85 | 0.00 | 0.00 | 0.00 | B | B |
| | 86 | 0.00 | 0.00 | 0.00 | B | B |
| | 87 | 0.00 | 0.00 | 0.00 | B | B |
| | 88 | 0.00 | 0.00 | 0.00 | B | B |
| | 89 | 0.00 | 0.00 | 0.00 | A | A |
| | 90 | 0.00 | 0.00 | 0.00 | A | A |
| | 91 | 0.00 | 0.00 | 0.00 | A | A |
| | 92 | 0.00 | 0.00 | 0.00 | A | A |
| | 93 | 0.00 | 0.00 | 0.00 | A | A |
| | 94 | 0.00 | 0.00 | 0.00 | A | A |
| | 95 | 0.00 | 0.00 | 0.00 | A | A |
| | 96 | 0.00 | 0.00 | 0.00 | A | A |
| | 97 | 0.00 | 0.00 | 0.00 | A | A |
| Comparative | 1 | 0.50 | 1.00 | 0.50 | B | C |
| Example | 2 | 0.50 | 1.00 | 0.50 | B | C |
| | 3 | 0.00 | 0.00 | 0.00 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-101646, filed May 20, 2016 and Japanese Patent Application No. 2017-085085, filed Apr. 24, 2017 which are hereby incorporated by reference herein in their entirety.

What is claimed is:

1. An aqueous ink for ink jet, the aqueous ink comprising:
a pigment; and
a resin,
wherein the pigment is impregnated with a compound having a structure in which at least two structures each represented by General Formula (1) are bonded by a glycoside bond:

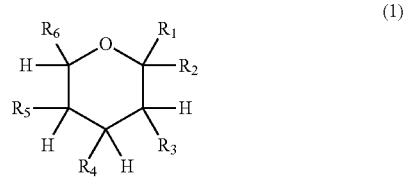

(1)

wherein, in General Formula (1), each of $R_1$ to $R_6$ is independently a hydrogen atom, a methyl group, a phosphonic acid group, —$(CH_2)_x$—OH, —(OCH($CH_3$))$_y$—COOH, —NH(COCH$_2$)$_z$—H, —OCOCH$_2$CH(OCOCH$_2$(OH)C$_{11}$H$_{22}$CH$_3$) C$_{10}$H$_{20}$CH$_3$, or —NHCOCH$_2$CH(OC$_{11}$H$_{22}$CH$_3$) C$_{10}$H$_{20}$CH$_3$, and at least one of $R_1$ and $R_2$ is a hydroxy group, and each of x, y, and z is independently a number from 0 or more to 6 or less.

2. The aqueous ink according to claim 1, wherein an amount of the compound with which the pigment is impregnated is 1 ppm or more to 4,500 ppm or less, in terms of mass ratio, to an amount of the pigment.

3. The aqueous ink according to claim 1, wherein a content (ppm) of the compound with which the pigment is impregnated, in terms of mass ratio, to a total content (ppm) of the compound in the ink is 90% or more.

4. The aqueous ink according to claim 1, wherein the resin has a unit derived from a (meth)acrylic acid ester.

5. The aqueous ink according to claim 1, wherein the resin includes at least one of a urethane resin, a block copolymer, and a resin particle.

6. The aqueous ink according to claim 5, wherein the urethane resin has a volume-average particle diameter of 15 nm or less, as determined by a dynamic light scattering method.

7. The aqueous ink according to claim 5, wherein a content (% by mass) of the urethane resin in terms of mass ratio with respect to a content (% by mass) of the pigment is 0.05 times or more to 2.00 times or less.

8. The aqueous ink according to claim 5, wherein the block copolymer includes a block having a carboxylic acid group.

9. The aqueous ink according to claim 5, wherein a content (% by mass) of the block copolymer in terms of mass ratio with respect to a content (% by mass) of the pigment is 0.05 times or more to 2.00 times or less.

10. The aqueous ink according to claim 5, wherein the resin particle has a volume-average particle diameter of 50 nm or more to 300 nm or less, as determined by a dynamic light scattering method.

11. The aqueous ink according to claim 5, wherein a content (% by mass) of the resin particle in terms of mass ratio with respect to a content (% by mass) of the pigment is 0.10 times or more to 10.00 times or less.

12. An ink cartridge comprising:
an ink; and
an ink storage portion storing the ink,
wherein the ink comprises the aqueous ink according to claim 1.

13. An ink jet recording method comprising ejecting an ink from an ink jet recording head to record an image on a recording medium,
wherein the ink comprises the aqueous ink according to claim 1.

14. The aqueous ink according to claim 1, wherein the compound has a weight-average molecular weight of 20,000 or more to 2,200,000 or less.

15. The aqueous ink according to claim 1, wherein the compound having the structure represented by General Formula (1) is at least one compound selected from the group consisting of rhamnose, glucose, galactose, mannose, glucuronic acid, xylose, glucosamine, N-acetylglucosamine, N-acetylgalactosamine, neuraminic acid, N-acetylneuraminic acid, muramic acid, N-acetylmuramic acid, and lipid A.

16. The aqueous ink according to claim 1, wherein the compound having the structure in which at least two structures each represented by General Formula (1) are bonded by a glycoside bond comprises a polysaccharide compound, and
wherein the polysaccharide compound is at least one polysaccharide compound selected from the group consisting of dextran, arabinoxylan, xanthan gum, guar gum, hyaluronic acid, gellan gum, ganglioside, peptidoglycan, and lipopolysaccharide.

17. The aqueous ink according to claim 1, wherein the content (% by mass) of the pigment in the ink is 0.1% by mass or more to 15.0% by mass or less based on the total mass of the ink.

18. The aqueous ink according to claim 1, wherein the content (% by mass) of the resin in the ink is 0.1% by mass or more to 20.0% by mass or less based on the total mass of the ink.

19. The aqueous ink according to claim 1, wherein the compound comprises a polysaccharide compound, and the content (ppm) of the polysaccharide compound present in a free state in the ink is 25 ppm or less based on the total mass of the ink, in which the polysaccharide compound present in a free state means that the polysaccharide compound is not incorporated into the pigment.

20. The aqueous ink according to claim 1, wherein the pigment is a self-dispersible pigment in which an anionic group is bonded directly or through another atomic group to the particle surface of the pigment.

21. The aqueous ink according to claim 1, wherein the pigment is a resin-dispersed pigment in which a resin dispersant is physically adsorbed onto the particle surface of the pigment and the resin dispersant functions to disperse the pigment.

* * * * *